United States Patent
Ozturk et al.

(10) Patent No.: US 12,207,176 B2
(45) Date of Patent: Jan. 21, 2025

(54) TECHNIQUES FOR RESTRICTING USER EQUIPMENT ACCESS TO C-BAND

(71) Applicant: QUALCOMM Incorporated, San Diego, CA (US)

(72) Inventors: Ozcan Ozturk, San Diego, CA (US); Tingfang Ji, San Diego, CA (US); Kausik Ray Chaudhuri, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 465 days.

(21) Appl. No.: 17/694,546

(22) Filed: Mar. 14, 2022

(65) Prior Publication Data

US 2023/0292221 A1  Sep. 14, 2023

(51) Int. Cl.
*H04W 48/04* (2009.01)
*H04W 24/08* (2009.01)

(52) U.S. Cl.
CPC .......... *H04W 48/04* (2013.01); *H04W 24/08* (2013.01)

(58) Field of Classification Search
CPC .............................. H04W 48/04; H04W 24/08
See application file for complete search history.

(56) References Cited

U.S. PATENT DOCUMENTS

| | | | |
|---|---|---|---|
| 2016/0021238 A1* | 1/2016 | Abramson | G06F 3/013 455/418 |
| 2021/0099839 A1* | 4/2021 | Chiu | G01S 5/02524 |
| 2023/0025104 A1* | 1/2023 | Kuriki | H04W 4/021 |

* cited by examiner

*Primary Examiner* — Faruk Hamza
*Assistant Examiner* — Alan L Lindenbaum
(74) *Attorney, Agent, or Firm* — Holland & Hart LLP

(57) ABSTRACT

Methods, systems, and devices for wireless communications are described. A network entity may receive a report from a user equipment (UE) positioned outside of an exclusion zone associated with a frequency band, where the report is associated with a mobility history of the UE, measurements performed by the UE, a tracking area update associated with the UE, or any combination thereof. The network entity may determine a probability that the UE is located on an aircraft based on the report, and may perform one or more actions to prevent or restrict access of the UE to the frequency band based on the probability satisfying a threshold probability.

28 Claims, 16 Drawing Sheets

TECHNIQUES FOR RESTRICTING USER EQUIPMENT ACCESS TO C-BAND

FIELD OF TECHNOLOGY

The following relates to wireless communications, including techniques for restricting user equipment (UE) access to C-band.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

Some wireless communications systems operate within a frequency range between 3.7 and 3.98 GHz, which is part of what is known as the "C-band." This frequency range is also commonly used by aircraft altimeters.

SUMMARY

The described techniques relate to improved methods, systems, devices, and apparatuses that support techniques for restricting user equipment access to C-band. For example, the described techniques provide solutions which enable the network to identify user equipments (UEs) that are located on an aircraft in order to exclude such UEs from operating within the C-Band. In particular, techniques described herein may be used to identify UEs that are likely located on an aircraft, and prevent such UEs from operating within the C-band in order to reduce (or eliminate) interference with the aircraft's altimeter. The network may estimate a probability that a UE is positioned on an aircraft based on a number of parameters, including mobility history (e.g., previous cells the UE has connected to), idle mode measurements (e.g., speed, location, heading), altitude, tracking areas, and the like. Upon determining that a UE is likely positioned on an aircraft, the network may take several actions to exclude or restrict access of the UE to the C-band. For example, the network may prevent the UE from camping on the C-band, bar the UE from accessing the C-band for some time period, release a C-band connection with the UE, de-prioritize the C-band for cell selection/re-selection, or any combination thereof.

A method for wireless communication at a network entity is described. The method may include receiving a report from a UE positioned outside of an exclusion zone associated with a frequency band, where the report is associated with a mobility history of the UE, measurements performed by the UE, a tracking area update (TAU) associated with the UE, or any combination thereof, determining a probability that the UE is located on an aircraft based on the report, and performing one or more actions to prevent or restrict access of the UE to the frequency band based on the probability satisfying a threshold probability.

An apparatus for wireless communication at a network entity is described. The apparatus may include a processor, memory coupled with the processor, and instructions stored in the memory. The instructions may be executable by the processor to cause the apparatus to receive a report from a UE positioned outside of an exclusion zone associated with a frequency band, where the report is associated with a mobility history of the UE, measurements performed by the UE, a TAU associated with the UE, or any combination thereof, determine a probability that the UE is located on an aircraft based on the report, and perform one or more actions to prevent or restrict access of the UE to the frequency band based on the probability satisfying a threshold probability.

Another apparatus for wireless communication at a network entity is described. The apparatus may include means for receiving a report from a UE positioned outside of an exclusion zone associated with a frequency band, where the report is associated with a mobility history of the UE, measurements performed by the UE, a TAU associated with the UE, or any combination thereof, means for determining a probability that the UE is located on an aircraft based on the report, and means for performing one or more actions to prevent or restrict access of the UE to the frequency band based on the probability satisfying a threshold probability.

A non-transitory computer-readable medium storing code for wireless communication at a network entity is described. The code may include instructions executable by a processor to receive a report from a UE positioned outside of an exclusion zone associated with a frequency band, where the report is associated with a mobility history of the UE, measurements performed by the UE, a TAU associated with the UE, or any combination thereof, determine a probability that the UE is located on an aircraft based on the report, and perform one or more actions to prevent or restrict access of the UE to the frequency band based on the probability satisfying a threshold probability.

Some examples of the method, apparatuses, and non-transitory computer-readable medium described herein may further include operations, features, means, or instructions for identifying one or more serving cells with which the UE was previously connected to based on the mobility history, where determining the probability may be based on the one or more serving cells.

Some examples of the method, apparatuses, and non-transitory computer-readable medium described herein may further include operations, features, means, or instructions for identifying one or more time durations during which the UE was previously connected to the one or more serving cells based on the mobility history, where determining the probability may be based on the one or more time durations.

Some examples of the method, apparatuses, and non-transitory computer-readable medium described herein may further include operations, features, means, or instructions for transmitting a request for the report, where receiving the report may be based on the request.

Some examples of the method, apparatuses, and non-transitory computer-readable medium described herein may further include operations, features, means, or instructions for identifying that the UE may have established a wireless connection with a serving cell associated with the frequency band, where transmitting the request may be based on identifying that the UE may have established the wireless connection.

Some examples of the method, apparatuses, and non-transitory computer-readable medium described herein may further include operations, features, means, or instructions for receiving, via the request, an indication of a time at which a last mobility history report was transmitted by the UE, where determining the probability may be based on the indication of the time.

In some examples of the method, apparatuses, and non-transitory computer-readable medium described herein, the measurements performed by the UE include reference signal received power (RSRP) measurements, reference signal received quality (RSRQ) measurements, or both, associated with reference signals received from one or more serving cells communicatively couplable to the UE and determining the probability may be based on the RSRP measurements, the RSRQ measurements, or both.

In some examples of the method, apparatuses, and non-transitory computer-readable medium described herein, an idle operational mode of the UE, an inactive operational mode of the UE, and a connected operational mode of the UE.

Some examples of the method, apparatuses, and non-transitory computer-readable medium described herein may further include operations, features, means, or instructions for determining a location of the UE, a speed of the UE, a path of the UE, or any combination thereof, based on the report, where determining the probability may be based on the location, the speed, the path, or any combination thereof.

Some examples of the method, apparatuses, and non-transitory computer-readable medium described herein may further include operations, features, means, or instructions for transmitting, to the UE, control signaling indicating one or more trigger conditions for transmitting reports associated with the frequency band, where receiving the report may be based on the control signaling.

Some examples of the method, apparatuses, and non-transitory computer-readable medium described herein may further include operations, features, means, or instructions for determining an altitude associated with the UE based on the report, where determining the probability may be based on the altitude.

Some examples of the method, apparatuses, and non-transitory computer-readable medium described herein may further include operations, features, means, or instructions for receiving, via the report, a TAU associated with the UE, a tracking area indicator (TAI) associated with the UE, or both, where determining the probability may be based on the TAU, the TAI, or both.

Some examples of the method, apparatuses, and non-transitory computer-readable medium described herein may further include operations, features, means, or instructions for identifying one or more tracking areas in which the UE was previously positioned based on the TAU, where determining the probability may be based on the one or more tracking areas.

Some examples of the method, apparatuses, and non-transitory computer-readable medium described herein may further include operations, features, means, or instructions for identifying one or more time durations during which the UE was previously positioned within the one or more tracking areas based on the TAU, where determining the probability may be based on the one or more time durations.

In some examples of the method, apparatuses, and non-transitory computer-readable medium described herein, performing the one or more actions may include operations, features, means, or instructions for transmitting, to the UE, a system information block (SIB) message including a barring parameter associated with a prohibition for camping on serving cells associated with the frequency band.

In some examples of the method, apparatuses, and non-transitory computer-readable medium described herein, performing the one or more actions may include operations, features, means, or instructions for releasing a wireless connection between the UE and a serving cell associated with the frequency band and transmitting, to the UE based on releasing the wireless connection, a control message that deprioritizes serving cells associated with the frequency band for a time interval.

In some examples of the method, apparatuses, and non-transitory computer-readable medium described herein, performing the one or more actions may include operations, features, means, or instructions for delaying an establishment of a wireless connection with the UE, an addition of a secondary node at the UE, or both.

Some examples of the method, apparatuses, and non-transitory computer-readable medium described herein may further include operations, features, means, or instructions for transmitting control signaling indicating a deprioritization of serving cells associated with the frequency band for cell selection procedures, cell re-selection procedures, handover procedures, or any combination thereof, where performing the one or more actions may be based on the control signaling.

In some examples of the method, apparatuses, and non-transitory computer-readable medium described herein, the frequency band includes at least a portion of a C-band.

In some examples of the method, apparatuses, and non-transitory computer-readable medium described herein, the frequency band includes at least a portion a frequency range between 3.7 GHz and 3.98 GHz.

In some examples of the method, apparatuses, and non-transitory computer-readable medium described herein, the exclusion zone includes a geographical area associated with an airport in which wireless communication within the frequency band may be restricted or prohibited.

A method for wireless communication at a UE is described. The method may include obtaining information associated with the UE, the information including a mobility history of the UE, measurements performed by the UE, a TAU associated with the UE, or any combination thereof, where the UE is positioned outside of an exclusion zone associated with a frequency band, determining a probability that the UE is located on an aircraft based on the information, and performing one or more actions to prevent or restrict access of the UE to the frequency band based on the probability satisfying a threshold probability.

An apparatus for wireless communication at a UE is described. The apparatus may include a processor, memory coupled with the processor, and instructions stored in the memory. The instructions may be executable by the processor to cause the apparatus to obtain information associated with the UE, the information including a mobility history of the UE, measurements performed by the UE, a TAU associated with the UE, or any combination thereof, where the UE is positioned outside of an exclusion zone associated with a frequency band, determine a probability that the UE is located on an aircraft based on the information, and perform one or more actions to prevent or restrict access of the UE to the frequency band based on the probability satisfying a threshold probability.

Another apparatus for wireless communication at a UE is described. The apparatus may include means for obtaining information associated with the UE, the information including a mobility history of the UE, measurements performed by the UE, a TAU associated with the UE, or any combination thereof, where the UE is positioned outside of an exclusion zone associated with a frequency band, means for determining a probability that the UE is located on an aircraft based on the information, and means for performing one or more actions to prevent or restrict access of the UE to the frequency band based on the probability satisfying a threshold probability.

A non-transitory computer-readable medium storing code for wireless communication at a UE is described. The code may include instructions executable by a processor to obtain information associated with the UE, the information including a mobility history of the UE, measurements performed by the UE, a TAU associated with the UE, or any combination thereof, where the UE is positioned outside of an exclusion zone associated with a frequency band, determine a probability that the UE is located on an aircraft based on the information, and perform one or more actions to prevent or restrict access of the UE to the frequency band based on the probability satisfying a threshold probability.

In some examples of the method, apparatuses, and non-transitory computer-readable medium described herein, performing the one or more actions may include operations, features, means, or instructions for releasing a wireless connection with a serving cell associated with the frequency band and deprioritizing serving cells associated with the frequency band for cell selection procedures, cell re-selection procedures, handover procedures, or any combination thereof.

Some examples of the method, apparatuses, and non-transitory computer-readable medium described herein may further include operations, features, means, or instructions for identifying one or more serving cells with which the UE was previously connected to based on the mobility history, where determining the probability may be based on the one or more serving cells.

Some examples of the method, apparatuses, and non-transitory computer-readable medium described herein may further include operations, features, means, or instructions for identifying one or more time durations during which the UE was previously connected to the one or more serving cells based on the mobility history, where determining the probability may be based on the one or more time durations.

In some examples of the method, apparatuses, and non-transitory computer-readable medium described herein, the measurements performed by the UE include RSRP measurements, RSRQ measurements, or both, associated with reference signals received from one or more serving cells communicatively couplable to the UE and determining the probability may be based on the RSRP measurements, the RSRQ measurements, or both.

Some examples of the method, apparatuses, and non-transitory computer-readable medium described herein may further include operations, features, means, or instructions for determining a location of the UE, a speed of the UE, a path of the UE, or any combination thereof, based on the information, where determining the probability may be based on the location, the speed, the path, or any combination thereof.

Some examples of the method, apparatuses, and non-transitory computer-readable medium described herein may further include operations, features, means, or instructions for determining an altitude associated with the UE based on the information, where determining the probability may be based on the altitude.

Some examples of the method, apparatuses, and non-transitory computer-readable medium described herein may further include operations, features, means, or instructions for identifying one or more tracking areas in which the UE was previously positioned based on the TAU, where determining the probability may be based on the one or more tracking areas.

Some examples of the method, apparatuses, and non-transitory computer-readable medium described herein may further include operations, features, means, or instructions for identifying one or more time durations during which the UE was previously positioned within the one or more tracking areas based on the TAU, where determining the probability may be based on the one or more time durations.

In some examples of the method, apparatuses, and non-transitory computer-readable medium described herein, the frequency band includes at least a portion of a C-band.

In some examples of the method, apparatuses, and non-transitory computer-readable medium described herein, the frequency band includes at least a portion a frequency range between 3.7 GHz and 3.98 GHz.

In some examples of the method, apparatuses, and non-transitory computer-readable medium described herein, the exclusion zone includes a geographical area associated with an airport in which wireless communication within the frequency band may be restricted or prohibited.

DETAILED DESCRIPTION

Figure 1:
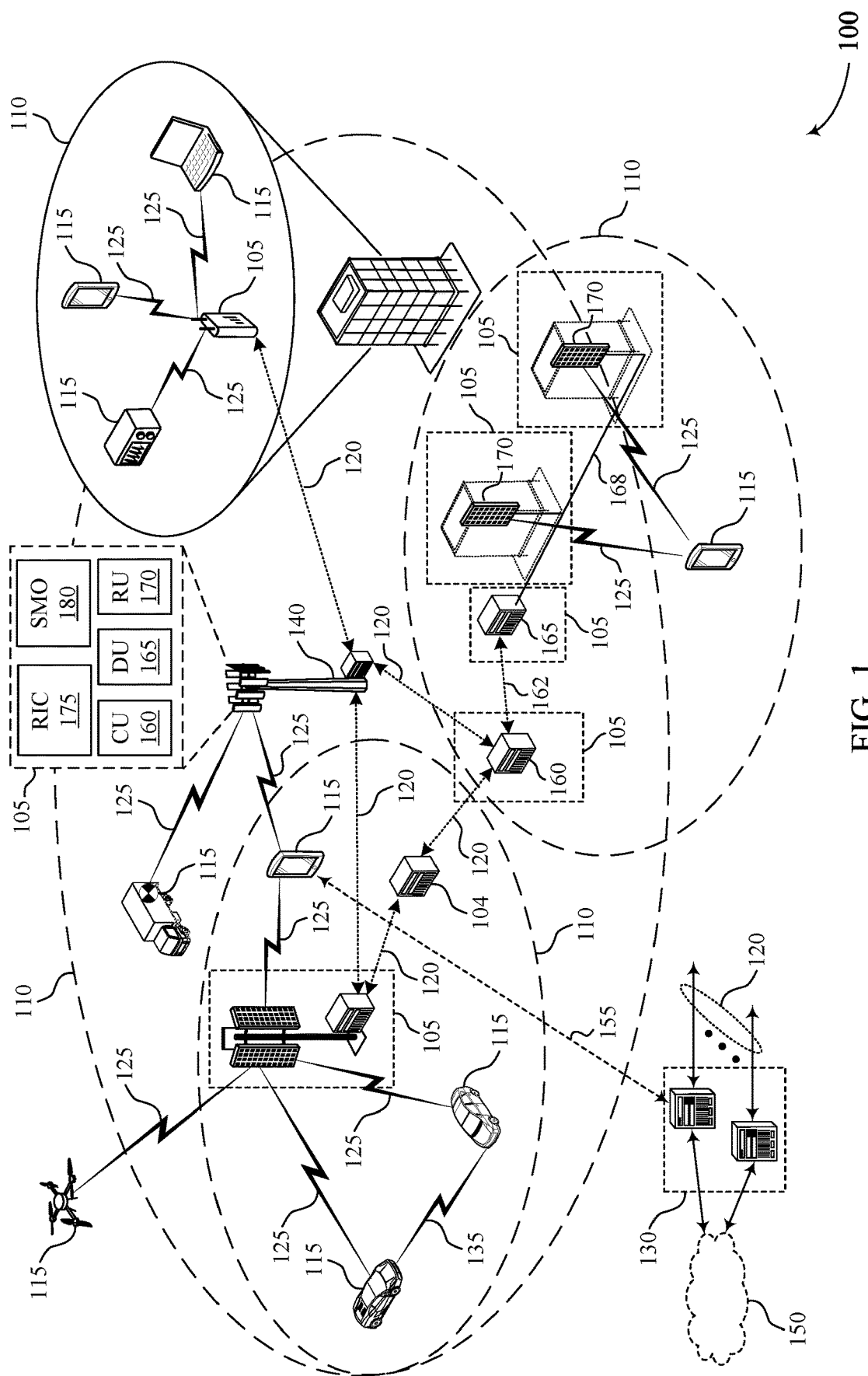
FIG. 1 illustrates an example of a wireless communications system that supports techniques for restricting user equipment access to C-band in accordance with one or more aspects of the present disclosure.

Some wireless communications systems operate within a frequency range between 3.7 and 3.98 GHz, which is part of what is known as the "C-band." However, this frequency range is also commonly used by aircraft altimeters, and there is a concern that NR communications within the C-band will interfere with such aircraft altimeters. In order to reduce potential interference with altimeters, the Federal Aviation Administration (FAA) has instituted "exclusion zones" around airports where communications within the C-band is prohibited. As such, UEs within such exclusion zones are not able to communicate within the C-band, thereby reducing potential interference.

However, UEs which are located outside of exclusion zones may in some cases still access the C-band and cause interference with aircraft altimeters. For example, UEs located on an aircraft may be positioned outside of airport exclusion zones during takeoff and landing. As such, the UEs on the aircraft may not be subject to the exclusion zone, and may therefore perform wireless communications within the C-band, thereby resulting in interference with the aircraft's altimeter. Such interference may resulted in flight cancellations or otherwise disrupt air traffic.

Accordingly, aspects of the present disclosure provide solutions which enable a network to identify UEs that are located on an aircraft in order to exclude such UEs from operating within the C-band. In particular, techniques described herein may be used to identify UEs that are likely located on an aircraft, and prevent such UEs from operating within the C-band in order to reduce (or eliminate) interference with the aircraft's altimeter. The network may estimate a probability that a UE is positioned on an aircraft based on a number of parameters, including mobility history (e.g., previous cells the UE has connected to), idle mode measurements (e.g., speed, location, heading), altitude, tracking areas, and the like. Upon determining that a UE is likely positioned on an aircraft, the network may take several actions to exclude or restrict access of the UE to the C-band. For example, the network may prevent the UE from camping on the C-band, bar the UE from accessing the C-band for some time period, release a C-band connection with the UE, de-prioritize the C-Band for cell selection/re-selection, or any combination thereof.

In additional or alternative implementations, aspects of the present disclosure provide techniques which enable a UE to unilaterally determine a probability that the UE is positioned on an aircraft, and to perform actions to prevent or restrict access of the UE to the C-band. For example, upon determining that the UE is likely positioned on an aircraft, the UE may release a C-band connection, and deprioritize serving cells associated with the C-band for cell selection procedures, cell re-selection procedures, handover procedures, or any combination thereof.

Aspects of the disclosure are initially described in the context of wireless communications systems. Additional aspects of the disclosure are described in the context of an example process flow. Aspects of the disclosure are further illustrated by and described with reference to apparatus diagrams, system diagrams, and flowcharts that relate to techniques for restricting user equipment access to C-band.

FIG. 1 illustrates an example of a wireless communications system 100 that supports techniques for restricting user equipment access to C-band in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another over a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 through a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 175 is flexible and may support different functionalities depending upon which functions (e.g., network layer functions, protocol layer functions, baseband functions, RF functions, and any combinations thereof) are performed at a CU 160, a DU 165, or an RU 175. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160.

Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication over such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

For instance, an access network (AN) or RAN may include communications between access nodes (e.g., an IAB donor), IAB nodes 104, and one or more UEs 115. The IAB donor may facilitate connection between the core network 130 and the AN (e.g., via a wired or wireless connection to the core network 130). That is, an IAB donor may refer to a RAN node with a wired or wireless connection to core network 130. The IAB donor may include a CU 160 and at least one DU 165 (e.g., and RU 170), in which case the CU 160 may communicate with the core network 130 over an interface (e.g., a backhaul link). IAB donor and IAB nodes 104 may communicate over an F1 interface according to a protocol that defines signaling messages (e.g., an F1 AP protocol). Additionally, or alternatively, the CU 160 may communicate with the core network over an interface, which may be an example of a portion of backhaul link, and may communicate with other CUs 160 (e.g., a CU 160 associated with an alternative IAB donor) over an Xn-C interface, which may be an example of a portion of a backhaul link.

An IAB node 104 may refer to a RAN node that provides IAB functionality (e.g., access for UEs 115, wireless self-backhauling capabilities). A DU 165 may act as a distributed scheduling node towards child nodes associated with the IAB node 104, and the IAB-MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, or alternatively, an IAB node 104 may also be referred to as a parent node or a child node to other IAB nodes 104, depending on the relay chain or configuration of the AN. Therefore, the IAB-MT entity of IAB nodes 104 may provide a Uu interface for a child IAB node 104 to receive signaling from a parent IAB node 104, and the DU interface (e.g., DUs 165) may provide a Uu interface for a parent IAB node 104 to signal to a child IAB node 104 or UE 115.

For example, IAB node 104 may be referred to as a parent node that supports communications for a child IAB node, and referred to as a child IAB node associated with an IAB donor. The IAB donor may include a CU 160 with a wired or wireless connection (e.g., a backhaul communication link 120) to the core network 130 and may act as parent node to IAB nodes 104. For example, the DU 165 of IAB donor may relay transmissions to UEs 115 through IAB nodes 104, and may directly signal transmissions to a UE 115. The CU 160 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling over an NR Uu interface to MT of the IAB node 104. Communications with IAB node 104 may be scheduled by a DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture may be configured to support techniques for restricting user equipment access to C-band as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) over one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be positioned according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications over a particular carrier bandwidth or may be configurable to support communications over one of a set of carrier bandwidths. In some examples, the wireless communications system 100 may include network entities 105 or UEs 115 that support concurrent communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both) such that the more resource elements that a device receives and the higher the order of the modulation scheme, the higher the data rate may be for the device. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/$ ($\Delta f_{max} \cdot N_f$) seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., over a carrier) and may be associated with an identifier for distinguishing neighboring cells (e.g., a physical cell identifier (PCID), a virtual cell identifier (VCID), or others). In some examples, a cell may also refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be able to communicate directly with other UEs 115 over a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by or scheduled by the network entity 105. In some examples, one or more UEs 115 in such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without the involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, which may be referred to as clusters, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. While operating in unlicensed RF spectrum bands, devices such as the network entities 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located in diverse geographic locations. A network entity 105 may have an antenna array with a set of rows and columns of antenna ports that the network entity 105 may use to support beamforming of communications with a UE 115. Likewise, a UE 115 may have one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multipanel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a receiving device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), highest signal-to-interference-plus-noise ratio (SINR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate over logical channels. A MAC layer may perform priority handling and multiplexing of logical channels into transport channels. The MAC layer may also use error detection techniques, error correction techniques, or both to support retransmissions at the MAC layer to improve link efficiency. In the control plane, the RRC protocol layer may provide establishment, configuration, and maintenance of an RRC connection between a UE 115 and a network entity 105 or a core network 130 supporting radio bearers for user plane data. At the PHY layer, transport channels may be mapped to physical channels.

The UEs 115 and the network entities 105 may support retransmissions of data to increase the likelihood that data is received successfully. Hybrid automatic repeat request (HARQ) feedback is one technique for increasing the likelihood that data is received correctly over a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In some other examples, the device may provide HARQ feedback in a subsequent slot, or according to some other time interval.

The UEs 115 and the network entities 105 of the wireless communications system 100 may support signaling and techniques which enable network to identify UEs 115 that are located on an aircraft in order to exclude such UEs 115 from operating within the C-band. In particular, the wireless communications system 100 may support techniques which enables the network to identify UEs 115 that are likely located on an aircraft, and prevent such UEs 115 from operating within the C-band in order to reduce (or eliminate) interference with the aircraft's altimeter.

For example, a network entity 105 of the wireless communications system 100 may estimate a probability that a UE 115 is positioned on an aircraft based on a number of parameters, including mobility history (e.g., previous cells the UE 115 has connected to), idle mode measurements (e.g., speed, location, heading), altitude, tracking areas, and the like. Upon determining that the UE 115 is likely positioned on an aircraft, the network entity 105 may take several actions to exclude or restrict access of the UE 115 to the C-band. For example, the network entity 105 may prevent the UE 115 from camping on the C-band, bar the UE 115 from accessing the C-band for some time period, release a C-band connection with the UE 115, de-prioritize the C-Band for cell selection/re-selection, or any combination thereof.

In additional or alternative implementations, the UEs 115 of the wireless communications system 100 may support techniques which enable the UEs 115 to unilaterally determine a probability that the respective UEs 115 are positioned on an aircraft, and to perform actions to prevent or restrict access of the UEs 115 to the C-band. For example, upon determining that the UE 115 is likely positioned on an aircraft, the UE 115 may release a C-band connection, and deprioritize serving cells associated with the C-band for cell selection procedures, cell re-selection procedures, handover procedures, or any combination thereof.

Techniques described herein may reduce or eliminate interference within the C-band at aircraft altimeters. In particular, techniques described herein may be used to identify UEs that are likely positioned on aircraft, and prevent or restrict access of such UEs to the C-band, thereby reducing (or eliminating) wireless communications of UEs on aircraft within the C-band. As such, techniques described herein may reduce C-band interference experienced by aircraft components even in cases where the aircraft is located outside of an exclusion zone associated with the C-band, such as during takeoff and landing. In this regard, techniques described herein may improve an efficiency of aircraft components (e.g., altimeters), and improve overall aircraft safety, while retaining the ability of UEs 115 to perform NR/5G communications in and around aircraft and airports.

Figure 2:
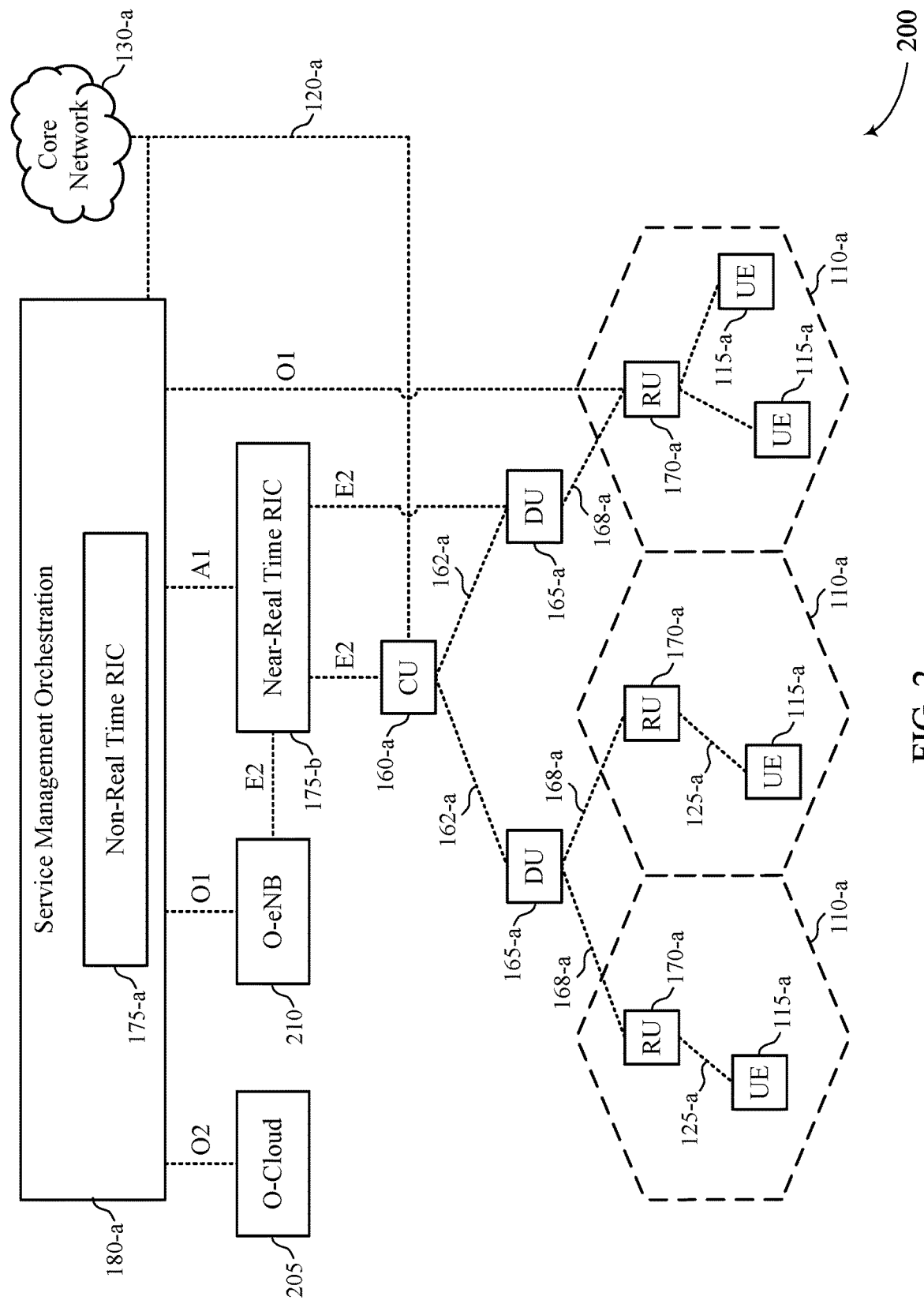
FIG. 2 illustrates an example of a wireless communications system that supports techniques for restricting user equipment access to C-band in accordance with one or more aspects of the present disclosure.

FIG. 2 illustrates an example of a network architecture 200 (e.g., a disaggregated base station architecture, a disaggregated RAN architecture) that supports techniques for restricting user equipment access to C-band in accordance with one or more aspects of the present disclosure. The network architecture 200 may illustrate an example for implementing one or more aspects of the wireless communications system 100. The network architecture 200 may include one or more CUs 160-a that may communicate directly with a core network 130-a via a backhaul communication link 120-a, or indirectly with the core network 130-a through one or more disaggregated network entities 105 (e.g., a Near-RT RIC 175-b via an E2 link, or a Non-RT RIC 175-a associated with an SMO 180-a (e.g., an SMO Framework), or both). A CU 160-a may communicate with one or more DUs 165-a via respective midhaul communication links 162-a (e.g., an F1 interface). The DUs 165-a may communicate with one or more RUs 170-a via respective fronthaul communication links 168-a. The RUs 170-a may communicate with respective UEs 115-*a* via one or more communication links 125-*a*. In some implementations, a UE 115-*a* may be simultaneously served by multiple RUs 170-*a*.

Each of the network entities 105 of the network architecture 200 (e.g., CUs 160-*a*, DUs 165-*a*, RUs 170-*a*, Non-RT RICs 175-*a*, Near-RT RICs 175-*b*, SMOs 180-*a*, Open Clouds (O-Clouds) 205, Open eNBs (O-eNBs) 210) may include one or more interfaces or may be coupled with one or more interfaces configured to receive or transmit signals (e.g., data, information) via a wired or wireless transmission medium. Each network entity 105, or an associated processor (e.g., controller) providing instructions to an interface of the network entity 105, may be configured to communicate with one or more of the other network entities 105 via the transmission medium. For example, the network entities 105 may include a wired interface configured to receive or transmit signals over a wired transmission medium to one or more of the other network entities 105. Additionally, or alternatively, the network entities 105 may include a wireless interface, which may include a receiver, a transmitter, or transceiver (e.g., an RF transceiver) configured to receive or transmit signals, or both, over a wireless transmission medium to one or more of the other network entities 105.

In some examples, a CU 160-*a* may host one or more higher layer control functions. Such control functions may include RRC, PDCP, SDAP, or the like. Each control function may be implemented with an interface configured to communicate signals with other control functions hosted by the CU 160-*a*. A CU 160-*a* may be configured to handle user plane functionality (e.g., CU-UP), control plane functionality (e.g., CU-CP), or a combination thereof. In some examples, a CU 160-*a* may be logically split into one or more CU-UP units and one or more CU-CP units. A CU-UP unit may communicate bidirectionally with the CU-CP unit via an interface, such as an E1 interface when implemented in an O-RAN configuration. A CU 160-*a* may be implemented to communicate with a DU 165-*a*, as necessary, for network control and signaling.

A DU 165-*a* may correspond to a logical unit that includes one or more functions (e.g., base station functions, RAN functions) to control the operation of one or more RUs 170-*a*. In some examples, a DU 165-*a* may host, at least partially, one or more of an RLC layer, a MAC layer, and one or more aspects of a PHY layer (e.g., a high PHY layer, such as modules for FEC encoding and decoding, scrambling, modulation and demodulation, or the like) depending, at least in part, on a functional split, such as those defined by the 3rd Generation Partnership Project (3GPP). In some examples, a DU 165-*a* may further host one or more low PHY layers. Each layer may be implemented with an interface configured to communicate signals with other layers hosted by the DU 165-*a*, or with control functions hosted by a CU 160-*a*.

In some examples, lower-layer functionality may be implemented by one or more RUs 170-*a*. For example, an RU 170-*a*, controlled by a DU 165-*a*, may correspond to a logical node that hosts RF processing functions, or low-PHY layer functions (e.g., performing fast Fourier transform (FFT), inverse FFT (iFFT), digital beamforming, physical random access channel (PRACH) extraction and filtering, or the like), or both, based at least in part on the functional split, such as a lower-layer functional split. In such an architecture, an RU 170-*a* may be implemented to handle over the air (OTA) communication with one or more UEs 115-*a*. In some implementations, real-time and non-real-time aspects of control and user plane communication with the RU(s) 170-*a* may be controlled by the corresponding DU 165-*a*. In some examples, such a configuration may enable a DU 165-*a* and a CU 160-*a* to be implemented in a cloud-based RAN architecture, such as a vRAN architecture.

The SMO 180-*a* may be configured to support RAN deployment and provisioning of non-virtualized and virtualized network entities 105. For non-virtualized network entities 105, the SMO 180-*a* may be configured to support the deployment of dedicated physical resources for RAN coverage requirements which may be managed via an operations and maintenance interface (e.g., an O1 interface). For virtualized network entities 105, the SMO 180-*a* may be configured to interact with a cloud computing platform (e.g., an O-Cloud 205) to perform network entity life cycle management (e.g., to instantiate virtualized network entities 105) via a cloud computing platform interface (e.g., an O2 interface). Such virtualized network entities 105 can include, but are not limited to, CUs 160-*a*, DUs 165-*a*, RUs 170-*a*, and Near-RT RICs 175-*b*. In some implementations, the SMO 180-*a* may communicate with components configured in accordance with a 4G RAN (e.g., via an O1 interface). Additionally, or alternatively, in some implementations, the SMO 180-*a* may communicate directly with one or more RUs 170-*a* via an O1 interface. The SMO 180-*a* also may include a Non-RT RIC 175-*a* configured to support functionality of the SMO 180-*a*.

The Non-RT RIC 175-*a* may be configured to include a logical function that enables non-real-time control and optimization of RAN elements and resources, Artificial Intelligence (AI) or Machine Learning (ML) workflows including model training and updates, or policy-based guidance of applications/features in the Near-RT RIC 175-*b*. The Non-RT RIC 175-*a* may be coupled to or communicate with (e.g., via an A1 interface) the Near-RT RIC 175-*b*. The Near-RT RIC 175-*b* may be configured to include a logical function that enables near-real-time control and optimization of RAN elements and resources via data collection and actions over an interface (e.g., via an E2 interface) connecting one or more CUs 160-*a*, one or more DUs 165-*a*, or both, as well as an O-eNB 210, with the Near-RT RIC 175-*b*.

In some examples, to generate AI/ML models to be deployed in the Near-RT RIC 175-*b*, the Non-RT RIC 175-*a* may receive parameters or external enrichment information from external servers. Such information may be utilized by the Near-RT RIC 175-*b* and may be received at the SMO 180-*a* or the Non-RT RIC 175-*a* from non-network data sources or from network functions. In some examples, the Non-RT RIC 175-*a* or the Near-RT RIC 175-*b* may be configured to tune RAN behavior or performance. For example, the Non-RT RIC 175-*a* may monitor long-term trends and patterns for performance and employ AI or ML models to perform corrective actions through the SMO 180-*a* (e.g., reconfiguration via O1) or via generation of RAN management policies (e.g., A1 policies).

The network architecture 200 may support signaling and techniques which enable network to identify UEs 115 that are located on an aircraft in order to exclude such UEs 115 from operating within the C-band, as described previously herein. In particular, the network architecture 200 may support techniques which enables the network to identify UEs 115 that are likely located on an aircraft, and prevent such UEs 115 from operating within the C-band in order to reduce (or eliminate) interference with the aircraft's altimeter.

Figure 3:
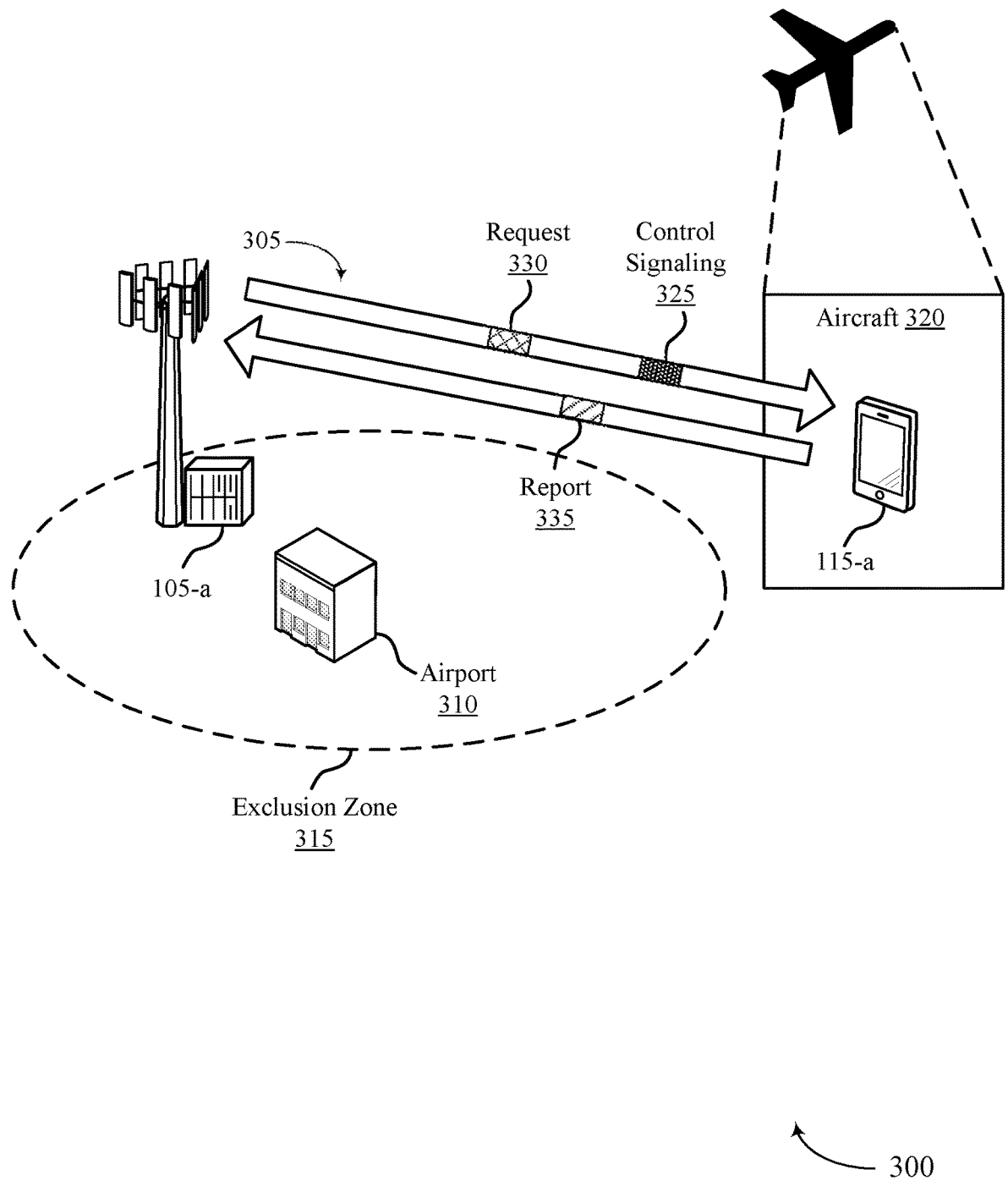
FIG. 3 illustrates an example of a wireless communications system that supports techniques for restricting user equipment access to C-band in accordance with one or more aspects of the present disclosure.

FIG. 3 illustrates an example of a wireless communications system 300 that supports techniques for restricting user equipment access to C-band in accordance with one or more aspects of the present disclosure. In some examples, the wireless communications system 300 may implement, or be implemented by, aspects of the wireless communications system 100, the network architecture 200, or both. In particular, the wireless communications system 300 may support techniques which enable UEs 115 and network entities 105 to determine probabilities that UEs 115 are positioned on an aircraft, and perform actions to prevent or restrict access of such UEs 115 to the C-band, as described herein.

The wireless communications system 300 may include a network entity 105-a (e.g., base station) and a UE 115-a, which may be examples of network entities 105, UEs 115, and other wireless as described with reference to FIG. 1. The UE 115-a may communicate with the network entity 105-a using a communication link 305, which may be an example of an NR or LTE link between the UE 115-a and the network entity 105-a. In some cases, the communication link 305 between the UE 115-a and the network entity 105-a may include an example of an access link (e.g., Uu link) which may include a bi-directional link that enables both uplink and downlink communication. For example, the UE 115-a may transmit uplink signals, such as uplink control signals or uplink data signals, to the network entity 105-a using the communication link 305, and the network entity 105-a may transmit downlink signals, such as downlink control signals or downlink data signals, to the UE 115-a using the communication link 305.

As noted previously herein, some wireless communications systems may operate within a frequency range between 3.7 and 3.98 GHz, which is part of what is known as the "C-band." However, this frequency range is also commonly used by aircraft altimeters, and there is a concern that NR communications within the C-band will interfere with such aircraft altimeters.

In order to reduce potential interference with altimeters, the FAA has instituted "exclusion zones" around airports where communications within the C-band is prohibited. For example, as shown in FIG. 3, the wireless communications system 300 may be implemented proximate to an airport 310. In this example, the airport 310 may include or be associated with an exclusion zone 315, where the exclusion zone 315 defines some boundary or geographical area proximate to (e.g., around, surrounding) the airport 310 in which wireless communications in the C-band is prohibited or restricted. In other words, UEs 115 positioned within the exclusion zone 315 may be unable to perform wireless communications within the C-band, thereby reducing potential interference with components of aircraft 320, such as an altimeter of the aircraft 320.

The implementation of exclusion zones 315 around airports 310 may prevent or reduce C-band interference within the respective exclusion zones 315. However, there is still a possibility that UEs 115 which are located outside of exclusion zones 315 may access the C-band and cause interference with aircraft altimeters. For example, as shown in FIG. 3, the aircraft 320 may exit the exclusion zone 315 while taking off and leaving the airport 310. In this regard, UEs 115 aboard the aircraft 320 (e.g., UE 115-a) may also be located outside of the exclusion zone 315, and may thereby not be subject to the C-band prohibition. Moreover, in cases where users do not turn off or place UEs 115 in "airplane mode," the UEs 115 aboard the aircraft may still be able to access network entities 105 of the wireless communications system 300 some time after initial take-off. As such, after exiting the exclusion zone 315, UEs 115 aboard the aircraft 320 may be able to access serving cells associated with the C-band for some time, which may result in interference with components of the aircraft 320, such as the altimeter.

Similar issues associated with UEs 115 accessing the C-band may arise when the aircraft 320 is preparing to land at the airport 310. For example, the aircraft 320 may be approaching the airport 310 in preparation for landing. In cases where users do not turn off or place UEs 115 in airplane mode, and before entering the exclusion zone, UEs 115 aboard the aircraft 320 may be able to access network entities 105 of the wireless communications system 300 and perform C-band communications. Such communications may result in interference at the aircraft 320 altimeter, thereby resulting in a safety concern prior to landing.

Accordingly, the wireless communications system 300 may support signaling and techniques which enable the network (e.g., network entity 105-b) to identify UEs 115 that are located on an aircraft 320 in order to exclude such UEs 115 from operating within the C-band (or other applicable frequency band). In particular, techniques described herein may be used to identify UEs 115 that are likely located on the aircraft 320, and prevent such UEs 115 from operating within the C-band in order to reduce (or eliminate) interference with an altimeter of the aircraft 320.

For example, the network entity 105-a may transmit control signaling 325 to the UE 115-a. The control signaling 325 may indicate one or more trigger conditions for transmitting reports 335 or other signaling associated with a restricted frequency band, such as the C-band. In other words, the control signaling 325 may indicate various conditions associated with C-band operation which, if satisfied, cause the UE 115-a to transmit a report 335 to the network entity 105-a.

For example, the control signaling 325 may indicate a trigger condition which causes the UE 115-a to transmit a report 335 if the UE 115-a is able to access (e.g., is communicatively couplable to) a threshold quantity of serving cells which exhibit an RSRP above a certain threshold. In this example, the trigger condition may cause the UE 115-a to transmit a report 335 to the network entity 105-a if it is able to connect to the threshold quantity of serving cells with sufficient reference signal received power (RSRP), which may suggest that the UE1 115-a is in the air aboard the aircraft 320. By way of another example, the control signaling 325 may indicate a trigger condition which causes the UE 115-a to transmit a report 335 if reference signal received quality (RSRQ) measurements for one or more serving cells is a threshold fraction of serving cell strength of total energy. In this example, the trigger condition may cause the UE 115-a to transmit a report 335 to the network entity 105-a if the UE 115-a experiences high RSRP and low RSRQ, which may suggest that the UE1 115-a is in the air aboard an aircraft 320.

In some implementations, the control signaling 325 may indicate trigger conditions associated with different operational modes at the UE 115-a, including an idle operational mode, an inactive operational mode, a connected operational mode, or any combination thereof. For example, the control signaling 325 may indicate a trigger condition associated with idle/inactive mode measurements associated with accessing a C-band cell. For example, a trigger condition may cause the UE 115-a to transmit a report 335 if a cell quality of a given C-band serving cell or frequency is above some threshold quality. Another trigger condition may be satisfied if the UE 115-a re-selects C-band cells in a defined order, and remains connected to the C-band cells for some threshold time duration.

In some aspects, the UE 115-*a* may obtain information associated with the UE 115-*a*, where the information includes a mobility history of the UE 115-*a*, measurements performed by the UE 115-*a*, a tracking area update (TAU) and/or tracking area indicator (TAI) associated with the UE 115-*a*, or any combination thereof. The UE 115-*a* may obtain the information (e.g., perform measurements) based on receiving the control signaling 325.

In some aspects, the information obtained by the UE 115-*a* may be used by the UE 115-*a*, the network entity 105-*a*, or both, do determine whether the UE 115-*a* is positioned on the aircraft 320 in order to prevent or restrict access of the UE 115-*a* to the C-band. In this regard, the information obtained (e.g., measured, retrieved, received) by the UE 115-*a* may include any information that may be used to determine a relative probability that the UE 115-*a* is positioned on the aircraft 320.

For example, the UE 115-*a* may retrieve mobility history information and/or tracking area information associated with the UE 115-*a* from a memory of the UE 115-*a*. By way of another example, the UE 115-*a* may perform measurements (e.g., RSRP, RSRQ, channel quality indicator (CQI), SNR, SINR) on signals received from serving cells which are communicatively couplable to the UE 115-*a* (e.g., serving cells which the UE 115-*a* may access). Serving cells accessible by the UE 115-*b* may be supported by the network entity 105-*b*, other network entities 105, or both. Such measurements may be used to determine a relative position of the UE 115-*a*, such as whether the UE 115-*a* is likely in the air or positioned on the aircraft 320.

In some implementations, the measurements may be performed while the UE 115-*a* is operating in one or more operational modes, such as an idle operational mode, an inactive operational mode, a connected operational mode, or any combination thereof. For example, in cases where the UE 115-*b* is positioned on the aircraft, the UE 115-*b* may be operating in an idle or inactive operational mode, but may still be configured to perform RSRP/RSRQ measurements on serving cells that are assessable by (e.g., communicatively couplable with) the UE 115-*b*.

In some aspects, the network entity 105-*a* may transmit, to the UE 115-*a*, a request 330 for a report 335 including information that may be used to determine whether or not the UE 115-*a* is positioned on an aircraft 320. For instance, the request 330 may include a request 330 for a report 335 associated with a mobility history of the UE 115-*a*, measurements performed by the UE 115-*a* (e.g., radio resource management (RRM) report), a TAU associated with the UE 115-*a* (e.g., TAU report), or any combination thereof.

The network entity 105-*a* may transmit the request 330 based on transmitting the control signaling 325. Additionally, or alternatively, the network entity 105-*a* may transmit the request 330 based on identifying that the UE 115-*a* has established (or attempted to establish) a wireless connection with a serving cell associated with the C-band. In other words, the network entity 105-*a* may request a report 335 in cases where the UE 115-*a* has performed, or is likely to perform, wireless communications within the C-band in order to verify that such communications will not result in interference with components of the aircraft 320.

In particular, the network entity 105-*a* may be configured to request mobility history reporting after wireless connections are established by the UE 115-*b* (e.g., via Msg6 of a random access procedure). For instance, the network entity 105-*a* may transmit the request 330 for mobility history information when the aircraft 320 is landing, in which case the UE 115-*a* establishes a wireless connection, and previous wireless connections are not from the local area of the network entity 105-*a* and/or airport 310. Moreover, the network entity 105-*a* may transmit the request 330 for mobility history information when the aircraft 320 is taking off. In this example, the request 330 may configure the UE 115-*b* to report periodic secondary node and/or main node measurements, which may be used to indicate the path of the UE 115-*a*.

The UE 115-*a* may transmit a report 335 to the network entity 105-*a*, where the report 335 may include any information that may be used to determine a relative probability that the UE 115-*a* is positioned on an aircraft 320. For example, the report 335 may include or indicate a mobility history of the UE 115-*a* (e.g., mobility history report), measurements performed by the UE 115-*a* (e.g., RRM report), a TAU associated with the UE 115-*a* (e.g., TAU report, TAI), or any combination thereof. In some cases, the UE 115-*a* may transmit the report 335 based on identifying a satisfaction of one or more trigger conditions which were configured via the control signaling 325. Additionally, or alternatively, the UE 115-*a* may transmit the report 335 in response to the request 330.

In some aspects, the report 335 may indicate a time at which a last mobility history report 335 was transmitted by the UE 115-*a*. In other words, the report 335 may indicate how recently the UE 115-*a* transmitted a mobility history report 335 (e.g., within the last 12 hours). The time of the most recent mobility history report 335 may be used to evaluate a relative probability that the UE 115-*a* is poisoned on an aircraft 320. In cases where the UE 115-*a* does not have any new mobility history information due to clearing such information since the last report, the network entity 105-*a* may be configured to retrieve the previous mobility history report from operations and maintenance (O&M) associated with the wireless communications system 300.

The report 335 at 420 may enable the network entity 105-*a* to evaluate a relative probability that the UE 115-*a* is positioned on an aircraft 320, and therefore enable the network entity 105-*a* to perform actions to prevent or restrict access of the UE 115-*a* to the C-band (or other restricted frequency band). Additionally, or alternatively, the UE 115-*a* may be configured to unilaterally determine whether it is positioned on an aircraft 320, and perform actions to prevent/restrict access of the UE 115-*a* to the C-band. In such cases where the UE 115-*a* acts unilaterally to restrict its own access to the C-band, the UE 115-*a* may not be expected to transmit the report 335 at 420.

The mobility history of the UE 115-*a* may be used to determine a relative probability that the UE 115-*a* is on the aircraft 320, as UEs 115 on the aircraft 320 will likely be traveling faster than other UEs 115 in the vicinity. Moreover, UEs 115 on the aircraft 320 while landing will likely have prior connections with far-away serving cells (e.g., serving cells in other cities).

Accordingly, in some aspects, the UE 115-*a*, the network entity 105-*a*, or both, may be configured to identify one or more serving cells with which the UE 115-*a* was previously connected to, one or more tracking areas in which the UE 115-*a* was previously positioned, or both. The UE 115-*a* and/or the network entity 105-*a* may determine the previous serving cells and/or tracking areas based on the mobility history of the UE 115-*a*, which may be communicated via the report 335. In the context of non-standalone (NSA) operation, a mobility history report (e.g., report 335) may be used by the main node (e.g., network entity 105-*a*) to find out the time the UE 115-*a* spent in previous cells, and thus possibly detect the path of UE 115-a and a probability that the UE 115-a is aboard the aircraft 320.

In some implementations, the UE 115-a, the network entity, 105-a, or both, may additionally determine one or more time durations during which the UE 115-a was connected to the previous serving cells and/or positioned within the previous tracking areas. For example, the network entity 105-a may determine that the UE 115-a was previously connected to Serving Cell A, Serving Cell B, and Serving Cell C. In this example, the network entity 105-a may determine that the UE 115-a was connected to Serving Cell A for 5 minutes, to Serving Cell B for 3 minutes, and to Serving Cell C for 4 minutes.

Previous serving cells which the UE 115-a was connected to and previous tracking areas the UE 115-a was positioned within (along with corresponding time durations) may be used by the UE 115-a and/or the network entity 105-a to determine a probability that the UE 115-a is positioned on an aircraft 320. In particular, recent connections to serving cells in remote cities or states may suggest that the UE 115-a is traveling quickly, and may likely be aboard an aircraft 320.

Similarly, if the UE 115-a was recently positioned within far-away tracking areas, this may also suggest that the UE 115-a is traveling quickly, and may likely be aboard an aircraft 320. Moreover, if the UE 115-a has previously spent only short periods of time connected to previous serving cells or positioned within previous tracking areas, this may further suggest that the UE 115-a is traveling quickly and may be positioned on an aircraft 320. In some aspects, the MME and/or AMF associated with the wireless communications system 300 may be configured to record the time duration that the UE 115-a spent in each tracking area, where inter-MME/AMF signaling may be used to exchange this information between network entities 105 and other components of the wireless communications system 300.

Additionally, or alternatively, the UE 115-a, the network entity 105-a, or both, may determine one or more parameters associated with the UE 115-a that may be used to evaluate a relative probability that the UE 115-a may be positioned on the aircraft 320. For example, the UE 115-a and/or the network entity 105-a, may determine a location of the UE, a speed (velocity, Doppler estimate) of the UE 115-a, a path or heading of the UE 115-a, an altitude of the UE 115-a, or any combination thereof. In some aspects, measurements performed by the UE 115-a (e.g., RRM measurements) may be used to determine parameters associated with the UE 115-a, such as location, speed, path, and altitude.

For example, the network entity 105-a may be able to determine or estimate a speed and path of the UE 115-a based on the mobility history information received via the report 335. In particular, the mobility history report 335 may be used to determine the amount of time the UE 115-a spent in previous tracking areas and/or the amount of time the UE 115-a was connected to previous serving cells, and may thereby be used to detect the speed and path of the UE 115-a. (e.g., Doppler estimate) By way of another example, the network (e.g., network entity 105-a) may be configured to detect UEs 115 that are landing and taking off aboard the aircraft 320 at high speeds via RRM reports (e.g., report 335). Moreover, the location of the UE 115-a may be determined based on GPS information associated with the UE 115-a, and may be indicated via the report 335. Additionally or alternatively, the location of the UE 115-a may be estimated based on measurements performed by the network entity 105-a on signals received from the UE 115-a.

By way of another example, the UE 115-a and/or the network entity 105-a may estimate/determine an altitude of the UE 115-a based on measurements performed by the UE 115-a. For instance, the UE 115-a may perform measurements (e.g., RSRP, RSRQ) on signals received from serving cells which may be accessed by the UE 115-a (e.g., serving cells that are communicatively couplable to the UE 115-a). The UE 115-a may perform such measurements while operating in an idle mode of operation, an inactive mode of operation, a connected mode of operation, or any combination thereof. Moreover, in cases where the UE 115-a transmits the report 335, the report 335 may indicate the measurements associated with each of the respective serving cells.

Continuing with the example above, the measurements may be used to estimate/determine an altitude of the UE 115-a. In particular, if the UE 115-a is communicatively couplable to a threshold quantity of serving cells that exhibit an RSRP above an RSRP threshold, this may indicate that the UE 115-a is likely in the air. Further, the quantity of serving cells that exhibit an RSRP above the RSRP threshold may be used to determine the altitude of the UE 115-a. Further, if the measurements performed by the UE 115-a indicate high RSRP and low RSRQ, this may also indicate that the UE 115-a is in the air. As such, a comparison of RSRP and RSRQ measurements may be used to determine an altitude of the UE 115-a.

In some cases, for idle/inactive operational modes, the UE 115-a may be configured to measure frequencies/cells in the C-band around the airport 310. In some cases, the measurement configuration may be performed in accordance with an "early measurement reporting" feature similar to that used for fast secondary cell (SCell) and secondary node activation. In some aspects, the measurement configuration for measuring serving cells associated with the C-band may include a validity area of measurement, where the validity area may be limited to serving cells around (e.g., proximate to, surrounding) the airport 310. In some cases, the network entity 105-a may request the report 335 when the UE 115-a accesses a C-band cell. As such, the measurement configuration may cause the UE 115-a to transmit the report 335 upon accessing a serving cell associated with the C-band.

Subsequently, the UE 115-a, the network entity 105-a, or both, may determine a probability that the UE 115-a is on the aircraft 320. For example, the UE 115-a and/or the network entity 105-a may determine the probability that the UE 115-a is aboard the aircraft 320 based on serving cells the UE 115-a was previously connected to, and/or corresponding time durations during which the UE 115-a was connected to the respective serving cells. For instance, if the UE 115-a was previously connected to (or communicated with) ten different serving cells, and was only connected to each serving cell for a short period of time, this may indicate that the UE 115-a is or was moving relatively quickly, which may indicate a high probability that the UE 115-a is aboard the aircraft 320.

Similarly, the UE 115-a and/or the network entity 105-a may determine the probability that the UE 115-a is aboard the aircraft 320 based on one or more tracking areas the UE 115-a was previously positioned within, and/or corresponding time durations during which the UE 115-a was positioned within the respective serving cells. Once again, if the UE 115-a was previously positioned within many tracking areas that are far away from the network entity 105-a, and/or if the UE 115-a spent short amounts of time within each tracking area, this may indicate that the UE 115-a is or was moving relatively quickly, which may indicate a high probability that the UE 115-a is aboard the aircraft 320.

By way of another example, the UE 115-a and the network entity 105-a may determine the probability that the UE 115-a is aboard the aircraft 320 based on the estimated altitude of the UE 115-a. In particular, UEs 115 in the air typically detect more serving cells than UEs 115 on the ground. In cases where the estimated altitude of the UE 115-a suggests that the UE 115-a is in the air, there may be a high probability that the UE 115-a is in the aircraft 320.

Further, the UE 115-a and/or the network entity 105-a may determine the probability based on a TAU and/or TAI associated with the UE 115-a, which may be communicated via the report 335. In some cases, the UE 115-a landing at the airport 310 on the aircraft 320 may be configured to transmit a new TAU. Based on the last TAU and TAI (and when the last TAU/TAI was transmitted), the MME/AMF may be configured to detect an arriving UE 115-a on the aircraft 320. If the UE 115-a is turned on right before landing, it may be relatively easy to detect the UE 115-a is on the aircraft as there would not be any record of the UE 115-a in the MME/AMF. If not, the MME/AMF may be able to use time spent in previous tracking areas to differentiate UEs 115 that are on and off the aircraft 320, as described herein.

The UE 115-a, the network entity 105-a, or both, may compare the determined probability that the UE 115-a is positioned on the aircraft 320 to a threshold probability. The threshold probability may be configured, signaled to the UE 115-a and/or the network entity 105-a, dynamically configured, or any combination thereof. For example, in some cases, the threshold probability may be dynamically adjusted based on network conditions or surrounding parameters, including a quantity of aircraft 320 in the area, types of aircraft 320 in the area, quantities of UEs 115 in the area, network traffic, or any combination thereof.

In some aspects, the probability (P) that the UE 115-a is on an aircraft 320 may be considered to satisfy the threshold probability ($P_{Thresh}$) if the probability is greater than or equal to the threshold probability. (e.g., threshold probability satisfied if $P \geq P_{Thresh}$).

In cases where the probability does not satisfy the threshold probability (e.g., $P<P_{Thresh}$), this may indicate that the UE 115-a is likely not on the aircraft 320. As such, if the UE 115-a is not on the aircraft 320, and is not located within the exclusion zone 315 associated with the C-band, there may be a relatively low probability that wireless communications performed by the UE 115-a within the C-band will result in interference with aircraft 320 components. Accordingly, in such cases, the UE 115-a may be allowed or enabled to begin (or continue) communicating within the C-band.

Conversely, in cases where the probability does satisfy the threshold probability (e.g., $P \geq P_{Thresh}$), this may indicate a relatively high likelihood that the UE 115-a is on the aircraft 320. As such, if the UE 115-a is likely on the aircraft 320 (even if the UE 115-a is not positioned within the exclusion zone 315), there may be a relatively high probability that wireless communications performed by the UE 115-a within the C-band will result in interference with aircraft 320 components.

Accordingly, if the probability satisfies the threshold probability, the UE 115-a, the network entity 105-a, or both, may perform one or more actions to prevent or restrict access of the UE 115-a to the C-band (or other applicable frequency band). The UE 115-a and/or the network entity 105-a may perform the one or more actions based on determining that the probability the UE 115-a is on the aircraft 320 satisfies the threshold probability.

The network entity 105-a may perform a wide variety of actions to prevent or restrict access of the UE 115-a to the C-band. In some cases, the network entity 105-a may adjust RRM parameters to make access to the C-band more difficult for the UE 115-a. For example, the network entity 105-a may increase a QRxLevMin value of the C-band (N77 band) by some value (e.g., increase by 10 dB), increase a B1-NR threshold by some value (e.g., increase by 10 dB), delay a time period in which the UE 115-a is able to add a secondary node connection associated with the C-band, delay a time period in which the UE 115-a is able to establish a main node connection associated with the C-band, or any combination thereof.

In additional or alternative implementations, the network entity 105-a may bar, exclude, or otherwise prevent the UE 115-a from camping on serving cells associated with the C-band. In particular, serving cells associated with the C-band may utilize a barring flag in system information block (SIB) messages to prevent camping. For example, the network entity 105-a may transmit a SIB message (e.g., SIB1) including a barring parameter (barring flag) which prohibits the UE 115-a from camping on serving cells associated with the C-band for some time interval, or until one or more conditions are met. In some implementations, the barring parameter may only be applicable to UEs 115 in high mobility states in order to prevent inadvertently excluding UEs 115 that are not on an aircraft 320 from accessing the C-band.

In other cases where the UE 115-a has already established a C-band connection, the network entity 105-a may release the connection associated with the C-band between the network entity 105-a (or other network entity 105) and the UE 115-a. In such cases, after releasing the C-band connection, the network entity 105-a may deprioritize serving cells associated with the C-band. For instance, the network entity 105-a may transmit, to the UE 115-a, a control message that causes the UE 115-a to deprioritize serving cells associated with the C-band for some time interval, or until some condition is met (and accept only resume requests). In this regard, the network entity 105-a may transmit control signaling 325 indicating a deprioritization of serving cells associated with the C-band for cell selection procedures, cell re-selection procedures, cell handover procedures, or any combination thereof.

Conversely, in cases where the UE 115-a has not yet established a C-band connection, the network entity 105-a may delay an establishment of a wireless connection with the UE 115-a (e.g., during standalone (SA) operation), delay an addition of a secondary node at the UE 115-a (e.g., during NSA operation and/or dual connectivity), or both. Such delays may be useful when the aircraft 320 is landing, as the delay may prevent UEs 115 aboard the aircraft from accessing the C-band for some time until the aircraft 320 enters the exclusion zone 315.

Moreover, in some implementations, the UE 115-a may additionally or alternatively be configured to perform one or more actions to prevent or restrict access of the UE 115-a to the C-band. In other words, in some cases, the UE 115-a may act unilaterally (e.g., without explicit actions or signaling from the network entity 105-a) to restrict or prevent its own access to the C-band.

For example, in some implementations where the UE 115-a has already established a wireless connection with a serving cell associated with the C-band, the UE 115-a may release the wireless connection, and deprioritize serving cells associated with the C-band for cell selection procedures, cell-reselection procedures, handover procedures, or any combination thereof. Conversely, in cases where the UE 115-*a* has not yet established a C-band connection, the UE 115-*a* may bar itself from camping on a serving cell associated with the C-band for some time period, or until some condition is met. By way of another example, the UE 115-*a* may delay an establishment of a wireless connection with the UE 115-*a* (e.g., during SA operation), delay an addition of a secondary node at the UE 115-*a* (e.g., during NSA operation and/or dual connectivity), or both.

In some cases, the actions performed by the UE 115-*a* and/or network entity 105-*a* to prevent or restrict access of the UE 115-*a* to the C-band may be based on whether the UE 115-*a* is operating in a NSA or standalone (SA) mode of operation.

In the context of an NSA mode of operation the UE 115-*a* may not camp on (or imitate access with) a serving cell associated with the C-band (e.g., no interference unless the network entity 105-*a* adds NR/5G communications for NSA). Moreover, the network entity 105-*a* (e.g., main node) may be configured to obtain secondary node measurements from the UE 115-*b* before adding NR/5G communications. In such cases, the network entity 105-*b* may use measurements to determine if the UE 115-*a* is in the exclusion zone 315, and on the aircraft 320. In cases where the UE 115-*b* is aboard the aircraft 320 during landing, the UE 115-*b* may be configured with (e.g., signaled) a timer for adding a secondary node before connection that fits the time duration for landing. In such cases, the UE 115-*b* may be prevented or prohibited from adding a secondary node until expiration of the timer.

Comparatively, in the context of SA mode of operation, serving cells associated with the C-band may be made lower priority (deprioritized). In this regard, the network entity 105-*a* (e.g., primary cell (PCell) may obtain secondary cell (SCell) measurements from the UE 115-*a* before adding a carrier based on mobility detection. In cases where the UE 115-*a* has already connected to a C-band cell, the UE 115-*a* may be released with a timer that deprioritized C-band cells for some duration (e.g., deprioritized for 30 minutes).

It has been found that the relative quantity of wireless communications performed in the C-band (e.g., "load" of the C-band) may determine how detrimental C-band communications are to components of the aircraft 320. In particular, a load of the C-band less than 35% (e.g., 35% capacity of the C-band) has been shown exhibit relatively minor interference to C-band receivers, including aircraft altimeters. As such, load control may be used to determine the actions performed to prevent/restrict access of the C-band. In other words, the actions performed by the UE 115-*a* and/or the network entity 105-*a* to prevent/restrict access of the UE 115-*a* to the C-band may be dependent on a relative load (e.g., traffic load) within the C-band. In particular, the actions performed to restrict access may be based on a relative quantity of wireless communications performed within the C-band, or a quantity of UEs 115 currently connected to serving cells associated with the C-band.

For example, in cases where the C-band load is relatively high (e.g., large quantity of C-band communications), the UE 115-*a* and/or the network entity 105-*a* may perform actions which more severely restrict/prevent access of the UE 115-*a* to the C-band, such as completely preventing the UE 115-*a* from accessing the C-band. Comparatively, in cases where the C-band load is relatively low (e.g., lower quantity of C-band communications), there may be less of a risk that C-band communications performed by the UE 115-*a* will detrimentally affect the performance of the aircraft 320. Accordingly, in such cases, the UE 115-*a* and the network entity 105-*a* may perform less severe/restrictive actions, such as delaying an addition of a C-band secondary node.

In some aspects, actions to prevent/restrict access of the UE 115-*a* to the C-band may be performed at/between various components of the network. For example, an MME and/or AMF associated with the network entity 105-*a* may be configured to detect the UE 115-*a* arriving on the aircraft 320 based on the last TAU and TAI and received from the UE 115-*a* (e.g., via the report 335), and when the last TAU/TAI were transmitted. If the UE 115-*a* is turned on right before landing, then it may be relatively easy to detect that the UE 115-*a* is aboard the aircraft 320, as there would not be any record of the UE 115-*a* in the MME. Otherwise, the MME may not be able to distinguish UEs 115 heading towards the airport with very similar speed and path as the aircraft 320 (such as UEs 115 driving to the airport 310 in a car). As such, techniques described herein may inadvertently exclude C-band access of UEs 115 that are not located on an aircraft 320 (such as UEs 115 in terrestrial vehicles). However, such ancillary prevention of C-band access bay be acceptable due to the corresponding reduction in interference with aircraft 320 components (and therefore improved aircraft 320 safety).

In some aspects, techniques described herein may enable corrective action (e.g., prevention/restriction of C-band access) through signaling between the MME/AMF to the eNB/gNB associated with the network entity 105-*a*. For example, in some cases, the MME will instruct the eNB not to add a secondary node associated with the C-band at the UE 115-*a*. In the context of an SA mode of operation with NR communications, the AMF may be configured to request that the gNB release a C-band connection (with possibly a new cause value) if the UE 115-*a* is using (communicating within) the C-band. Moreover, if the operator is able to use different tracking area codes for the C-band, the AMF may be configured to initiate a connection release directly since it will know that the UE 115-*a* started the TAU in the C-band. In both cases, the network entity 105-*a* may utilize a new cause value that is configured to make the C-band frequency lower priority when releasing the connection.

Techniques described herein may reduce or eliminate interference within the C-band at aircraft 320 altimeters. In particular, techniques described herein may be used to identify a probability that the UE 115-*a* is positioned on aircraft 320, and prevent or restrict access of the UE 115-*a* to the C-band, thereby reducing (or eliminating) wireless communications of the UE 115-*a* on aircraft 320 within the C-band. As such, techniques described herein may reduce C-band interference experienced by aircraft 320 components even in cases where the aircraft 320 is located outside of an exclusion zone 315 associated with the C-band, such as during takeoff and landing. In this regard, techniques described herein may improve an efficiency of aircraft 320 components (e.g., altimeters), and improve overall aircraft 320 safety, while retaining the ability of the UE 115-*a* to perform NR/5G communications in and around aircraft 320 and airports 310.

Figure 4:
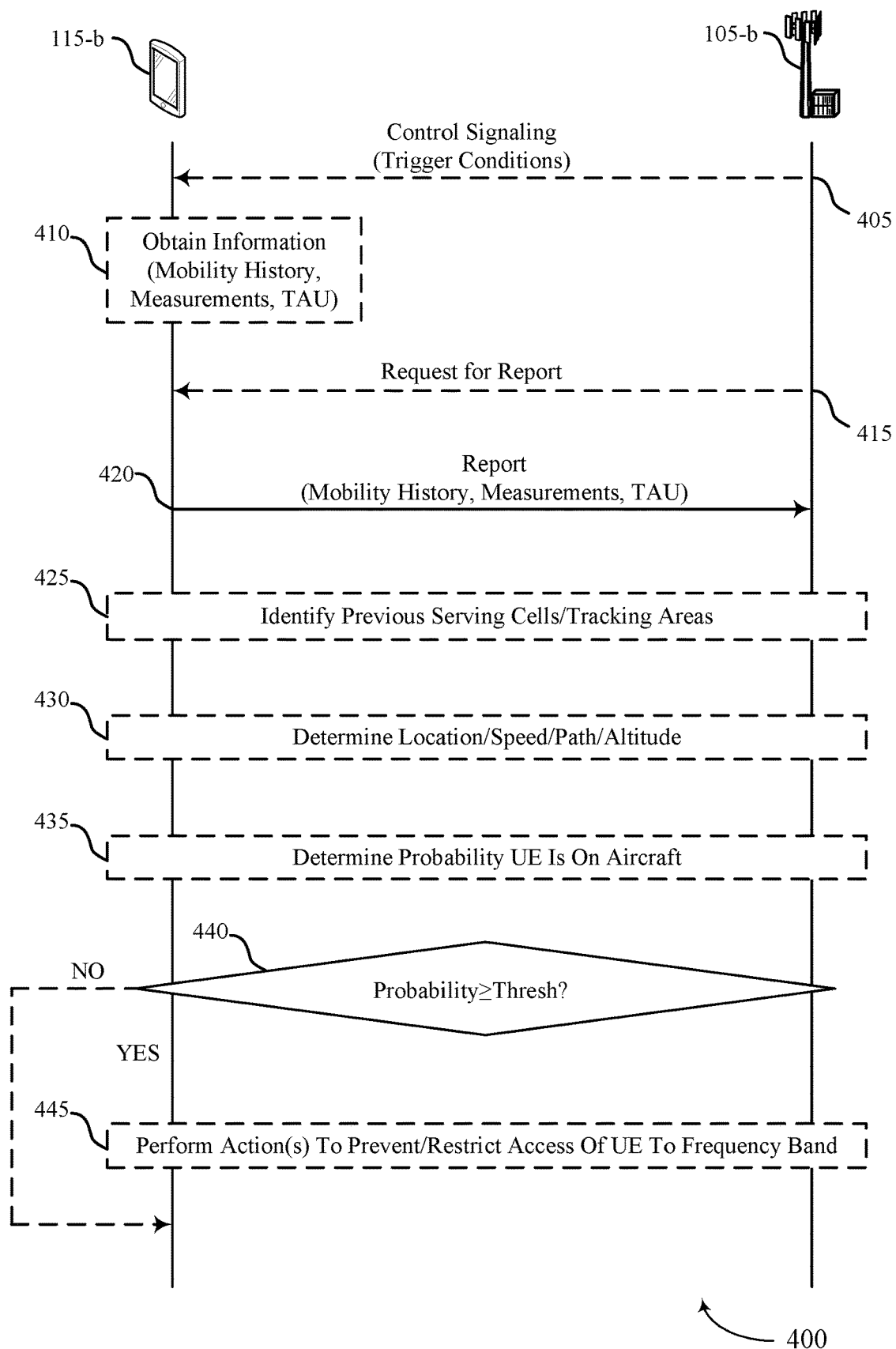
FIG. 4 illustrates an example of a process flow that supports techniques for restricting user equipment access to C-band in accordance with one or more aspects of the present disclosure.

FIG. 4 illustrates an example of a process flow 400 that supports techniques for restricting user equipment access to C-band in accordance with one or more aspects of the present disclosure. In some examples, the process flow 400 may implement, or be implemented by, aspects of the wireless communications system 100, the network architecture 200, the wireless communications system 300, or any combination thereof. In particular, the process flow 400 illustrates a UE 115-*b* and a network entity 105-*b* determining a probability that the UE 115-*b* is positioned on an aircraft, comparing the probability to a threshold probability, and performing one or more actions to prevent or restrict access of the UE 115-*b* to the C-band based on the probability satisfying the threshold probability, as described with reference to FIGS. 1-3.

In some cases, process flow 400 may include a UE 115-*b* and a network entity 105-*b*, which may be examples of corresponding devices as described herein. In particular, the UE 115-*b* and the network entity 105-*b* illustrated in FIG. 4 may include examples of the UE 115-*a* and the network entity 105-*a*, respectively, as illustrated in FIG. 3.

In some examples, the operations illustrated in process flow 400 may be performed by hardware (e.g., including circuitry, processing blocks, logic components, and other components), code (e.g., software) executed by a processor, or any combination thereof. Alternative examples of the following may be implemented, where some steps are performed in a different order than described or are not performed at all. In some cases, steps may include additional features not mentioned below, or further steps may be added.

In some implementations, the UE 115-*b* may be positioned outside an exclusion zone associated with a frequency band that is subject to restrictions or prohibitions, such that the UE 115-*b* is able to perform wireless communications within the respective frequency band. The exclusion zone may include a geographical area associated with (e.g., surrounding) an airport in which wireless communications within the respective frequency band is prohibited, restricted, or otherwise controlled. In some cases, the frequency band may include at least a portion of the C-band. For example, the frequency band may include at least a portion of a frequency range between 3.7 GHz and 3.98 GHz. For the purposes of simplicity, the process flow 400 will be described in the context of the C-band. However, this is solely for illustrative purposes. As such, techniques described with reference to process flow 400 may be implemented to prevent or restrict access of the UE 115-*b* to any applicable frequency band.

At 405, the network entity 105-*b* may transmit control signaling to the UE 115-*b*. The control signaling may indicate one or more trigger conditions for transmitting reports or other signaling associated with a restricted frequency band, such as the C-band. In other words, the control signaling may indicate various conditions associated with C-band operation which, if satisfied, cause the UE 115-*b* to transmit a report to the network entity 105-*b*.

For example, the control signaling may indicate a trigger condition which causes the UE 115-*b* to transmit a report if the UE 115-*b* is able to access (e.g., is communicatively couplable to) a threshold quantity of serving cells which exhibit an RSRP above a certain threshold. In this example, the trigger condition may cause the UE 115-*b* to transmit a report to the network entity 105-*b* if it is able to connect to the threshold quantity of serving cells with sufficient RSRP, which may suggest that the UE1 115-*b* is in the air aboard an aircraft. By way of another example, the control signaling may indicate a trigger condition which causes the UE 115-*b* to transmit a report if RSRQ measurements for one or more serving cells is a threshold fraction of serving cell strength of total energy. In this example, the trigger condition may cause the UE 115-*b* to transmit a report to the network entity 105-*b* if the UE 115-*b* experiences high RSRP and low RSRQ, which may suggest that the UE1 115-*b* is in the air aboard an aircraft.

At 410, the UE 115-*b* may obtain information associated with the UE 115-*b*, where the information includes a mobility history of the UE 115-*b*, measurements performed by the UE 115-*b*, a TAU associated with the UE 115-*b*, or any combination thereof. The UE 115-*b* may obtain the information (e.g., perform measurements) at 410 based on receiving the control signaling at 405.

In some aspects, the information obtained by the UE 115-*b* at 410 may be used by the UE 115-*b*, the network entity 105-*b*, or both, do determine whether the UE 115-*b* is positioned on an aircraft in order to prevent or restrict access of the UE 115-*b* to the C-band. In this regard, the information obtained (e.g., measured, retrieved, received) by the UE 115-*b* at 410 may include any information that may be used to determine a relative probability that the UE 115-*b* is positioned on an aircraft.

For example, the UE 115-*b* may retrieve mobility history information and/or tracking area information associated with the UE 115-*b* from a memory of the UE 115-*b*. By way of another example, the UE 115-*b* may perform measurements (e.g., RSRP, RSRQ, CQI, SNR, SINR) on signals received from serving cells which are communicatively couplable to the UE 115-*b* (e.g., serving cells which the UE 115-*b* may access). Such measurements may be used to determine a relative position of the UE 115-*b*, such as whether the UE 115-*b* is likely in the air or positioned on an aircraft. In some implementations, the measurements may be performed while the UE 115-*b* is operating in one or more operational modes, such as an idle operational mode, an inactive operational mode, a connected operational mode, or any combination thereof.

At 415, the network entity 105-*b* may transmit, to the UE 115-*b*, a request for a report. For example, the network entity 105-*b* may transmit a request for a report including information that may be used to determine whether or not the UE 115-*b* is positioned on an aircraft. For instance, the request may include a request for a report associated with a mobility history of the UE 115-*b*, measurements performed by the UE 115-*b*, a TAU associated with the UE 115-*b* (e.g., TAU report), or any combination thereof.

The network entity 105-*b* may transmit the request based on transmitting the control signaling at 405. Additionally, or alternatively, the network entity 105-*b* may transmit the request based on identifying that the UE 115-*b* has established (or attempted to establish) a wireless connection with a serving cell associated with the C-band. In other words, the network entity 105-*b* may request a report in cases where the UE 115-*b* has performed, or is likely to perform, wireless communications within the C-band in order to verify that such communications will not result in interference with aircraft components.

At 420, the UE 115-*b* may transmit a report to the network entity 105-*b*. The report may include any information that may be used to determine a relative probability that the UE 115-*b* is positioned on an aircraft, such as a mobility history of the UE 115-*b* (e.g., mobility history report), measurements performed by the UE 115-*b*, a TAU associated with the UE 115-*b* (e.g., TAU report, TAI), or any combination thereof.

The UE 115-*b* may transmit the report at 420 based on receiving the control signaling at 405, obtaining the information at 410, receiving the request at 415, or any combination thereof. For example, the UE 115-*b* may transmit the report at 420 based on identifying a satisfaction of one or more trigger conditions which were configured via the control signaling at 405. Additionally, or alternatively, the UE 115-*b* may transmit the report at 420 in response to the request at 415.

In some aspects, the report may indicate a time at which a last mobility history report was transmitted by the UE 115-*b*. In other words, the report may indicate how recently the UE 115-*b* transmitted a mobility history report. The time of the most recent mobility history report may be used to evaluate a relative probability that the UE 115-*b* is poisoned on an aircraft.

The report at 420 may enable the network entity 105-*b* to evaluate a relative probability that the UE 115-*b* is positioned on an aircraft, and therefore enable the network entity 105-*b* to perform actions to prevent or restrict access of the UE 115-*b* to the C-band (or other restricted frequency band). However, in additional or alternative implementations, the UE 115-*b* may be configured to unilaterally determine whether it is positioned on an aircraft, and perform actions to prevent/restrict access of the UE 115-*b* to the C-band. In such cases where the UE 115-*b* acts unilaterally to restrict its own access to the C-band, the UE 115-*b* may not be expected to transmit the report at 420.

At 425, the UE 115-*b*, the network entity 105-*b*, or both, may be configured to identify one or more serving cells with which the UE 115-*b* was previously connected to, one or more tracking areas in which the UE 115-*b* was previously positioned, or both. The UE 115-*b* and/or the network entity 105-*b* may determine the previous serving cells and/or tracking areas based on the mobility history of the UE 115-*b* that was obtained at 410, transmitted via the report at 420, or both.

In some implementations, the UE 115-*b*, the network entity, 105-*b*, or both, may additionally determine one or more time durations during which the UE 115-*b* was connected to the previous serving cells and/or positioned within the previous tracking areas. For example, the network entity 105-*b* may determine that the UE 115-*b* was previously connected to Serving Cell A, Serving Cell B, and Serving Cell C. In this example, the network entity 105-*b* may determine that the UE 115-*b* was connected to Serving Cell A for 5 minutes, to Serving Cell B for 3 minutes, and to Serving Cell C for 4 minutes.

Previous serving cells which the UE 115-*b* was connected to and previous tracking areas the UE 115-*b* was positioned within (along with corresponding time durations) may be used by the UE 115-*b* and/or the network entity 105-*b* to determine a probability that the UE 115-*b* is positioned on an aircraft. In particular, recent connections to serving cells in remote cities or states may suggest that the UE 115-*b* is traveling quickly, and may likely be aboard an aircraft. Similarly, if the UE 115-*b* was recently positioned within far-away tracking areas, this may also suggest that the UE 115-*b* is traveling quickly, and may likely be aboard an aircraft. Moreover, if the UE 115-*b* has previously spent only short periods of time connected to previous serving cells or positioned within previous tracking areas, this may further suggest that the UE 115-*b* is traveling quickly and may be positioned on an aircraft.

At 430, the UE 115-*b*, the network entity 105-*b*, or both, may determine one or more parameters associated with the UE 115-*b* that may be used to evaluate a relative probability that the UE 115-*b* may be positioned on an aircraft. For example, the UE 115-*b* and/or the network entity 105-*b*, may determine a location of the UE, a speed (velocity) of the UE 115-*b*, a path or heading of the UE 115-*b*, an altitude of the UE 115-*b*, or any combination thereof. In some aspects, the UE 115-*b* and/or the network entity 105-*b* may determine the parameters associated with the UE 115-*b* based on receiving/transmitting the control signaling at 405, obtaining the information at 410, receiving/transmitting the request at 415, transmitting/receiving the report at 420, identifying the previous serving cells/tracking areas at 425, or any combination thereof.

For example, the UE 115-*b* and/or the network entity 105-*b* may be able to determine or estimate a speed and path of the UE 115-*b* based on the mobility history information obtained at 410 and/or transmitted via the report at 420. In particular, the mobility history report may be used to determine the amount of time the UE 115-*b* spent in previous tracking areas and/or the amount of time the UE 115-*b* was connected to previous serving cells, and may thereby be used to detect the speed and path of the UE 115-*b*. By way of another example, the location of the UE 115-*b* may be determined based on GPS information associated with the UE 115-*b*, and may be indicated via the report. Additionally or alternatively, the location of the UE 115-*b* may be estimated based on measurements performed by the network entity 105-*b* on signals received from the UE 115-*b*.

By way of another example, the UE 115-*b* and/or the network entity 105-*b* may estimate/determine an altitude of the UE 115-*b* based on measurements performed by the UE 115-*b*. For instance, the UE 115-*b* may perform measurements (e.g., RSRP, RSRQ) on signals received from serving cells which may be accessed by the UE 115-*b* (e.g., serving cells that are communicatively couplable to the UE 115-*b*). The UE 115-*b* may perform such measurements while operating in an idle mode of operation, an inactive mode of operation, a connected mode of operation, or any combination thereof. Moreover, in cases where the UE 115-*b* transmits the report at 420, the report may indicate the measurements associated with each of the respective serving cells.

Continuing with the example above, the measurements may be used to estimate/determine an altitude of the UE 115-*b*. In particular, if the UE 115-*b* is communicatively couplable to a threshold quantity of serving cells that exhibit an RSRP above an RSRP threshold, this may indicate that the UE 115-*b* is likely in the air. Further, the quantity of serving cells that exhibit an RSRP above the RSRP threshold may be used to determine the altitude of the UE 115-*b*. Further, if the measurements performed by the UE 115-*b* indicate high RSRP and low RSRQ, this may also indicate that the UE 115-*b* is in the air. As such, a comparison of RSRP and RSRQ measurements may be used to determine an altitude of the UE 115-*b*.

At 435, the UE 115-*b*, the network entity 105-*b*, or both, may determine a probability that the UE 115-*b* is on an aircraft. The UE 115-*b*, the network entity 105-*b*, or both, may determine the probability at 435 based on receiving/transmitting the control signaling at 405, obtaining the information at 410, receiving/transmitting the request at 415, transmitting/receiving the report at 420, identifying previous serving cells/tracking areas at 425, determining parameters associated with the UE 115-*b* at 430, or any combination thereof.

For example, the UE 115-*b* and/or the network entity 105-*b* may determine the probability that the UE 115-*b* is aboard an aircraft based on serving cells the UE 115-*b* was previously connected to, and/or corresponding time durations during which the UE 115-*b* was connected to the respective serving cells. For instance, if the UE 115-*b* was previously connected to (or communicated with) ten different serving cells, and was only connected to each serving cell for a short period of time, this may indicate that the UE 115-*b* is or was moving relatively quickly, which may indicate a high probability that the UE 115-*b* is aboard an aircraft.

Similarly, the UE 115-*b* and/or the network entity 105-*b* may determine the probability that the UE 115-*b* is aboard an aircraft based on one or more tracking areas the UE 115-*b* was previously positioned within, and/or corresponding time durations during which the UE 115-*b* was positioned within the respective serving cells. Once again, if the UE 115-*b* was previously positioned within many tracking areas that are far away from the network entity 105-*b*, and/or if the UE 115-*b* spent short amounts of time within each tracking area, this may indicate that the UE 115-*b* is or was moving relatively quickly, which may indicate a high probability that the UE 115-*b* is aboard an aircraft.

By way of another example, the UE 115-*b* and the network entity 105-*b* may determine the probability that the UE 115-*b* is aboard an aircraft based on the estimated altitude of the UE 115-*b*. In cases where the estimated altitude of the UE 115-*b* suggests that the UE 115-*b* is in the air, there may be a high probability that the UE 115-*b* is in an aircraft. Further, the UE 115-*b* and/or the network entity 105-*b* may determine the probability based on a TAU associated with the UE 115-*b* and/or a TAI associated with the UE 115-*b*, which may be obtained at 410 and/or transmitted via the report at 420.

At 440, the UE 115-*b*, the network entity 105-*b*, or both, may compare the determined probability to a threshold probability. The threshold probability may be configured, signaled to the UE 115-*b* and/or the network entity 105-*b*, dynamically configured, or any combination thereof. For example, in some cases, the threshold probability may be dynamically adjusted based on network conditions or surrounding parameters, including a quantity of aircraft in the area, types of aircraft in the area, quantities of UEs 115 in the area, network traffic, or any combination thereof.

In some aspects, the probability (P) that the UE 115-*b* is on an aircraft may be considered to satisfy the threshold probability ($P_{Thresh}$) if the probability is greater than or equal to the threshold probability. (e.g., threshold probability satisfied if $P \geq P_{Thresh}$).

In cases where the probability does not satisfy the threshold probability (e.g., step 440=NO, $P<P_{Thresh}$), this may indicate that the UE 115-*b* is likely not on an aircraft. As such, if the UE 115-*b* is not on the aircraft, and is not located within an exclusion zone associated with the C-band, there may be a relatively low probability that wireless communications performed by the UE 115-*b* within the C-band will result in interference with aircraft components. Accordingly, in such cases, the UE 115-*b* may be allowed or enabled to begin (or continue) communicating within the C-band.

Conversely, in cases where the probability does satisfy the threshold probability (e.g., step 440=YES, $P \geq P_{Thresh}$), this may indicate a relatively high likelihood that the UE 115-*b* is on an aircraft. As such, if the UE 115-*b* is likely on an aircraft (even if the UE 115-*b* is not positioned within an exclusion zone associated with the C-band), there may be a relatively high probability that wireless communications performed by the UE 115-*b* within the C-band will result in interference with aircraft components. Accordingly, if the probability satisfies the threshold probability, the process flow 400 may proceed to 445.

At 445, the UE 115-*b*, the network entity 105-*b*, or both, may perform one or more actions to prevent or restrict access of the UE 115-*b* to the C-band (or other applicable frequency band). The UE 115-*b* and/or the network entity 105-*b* may perform the one or more actions based on determining the probability that the UE 115-*b* is on an aircraft at 435, determining that the probability satisfies a threshold probability at 440, or both.

The network entity 105-*b* may perform a wide variety of actions to prevent or restrict access of the UE 115-*b* to the C-band. In some cases, the network entity 105-*b* may adjust RRM parameters to make access to the C-band more difficult for the UE 115-*b*. For example, the network entity 105-*b* may increase a QRxLevMin value of the C-band (N77 band) by some value (e.g., increase by 10 dB), increase a B1-NR threshold by some value (e.g., increase by 10 dB), delay a time period in which the UE 115-*b* is able to add a secondary node connection associated with the C-band, delay a time period in which the UE 115-*b* is able to establish a main node connection associated with the C-band, or any combination thereof.

In additional or alternative implementations, the network entity 105-*b* may bar, exclude, or otherwise prevent the UE 115-*b* from camping on serving cells associated with the C-band. For example, the network entity 105-*b* may transmit a SIB message (e.g., SIB1) including a barring parameter which prohibits the UE 115-*b* from camping on serving cells associated with the C-band for some time interval, or until one or more conditions are met.

In other cases where the UE 115-*b* has already established a C-band connection, the network entity 105-*b* may release the connection associated with the C-band between the network entity 105-*b* (or other network entity 105) and the UE 115-*b*. In such cases, after releasing the C-band connection, the network entity 105-*b* may deprioritize serving cells associated with the C-band. For instance, the network entity 105-*b* may transmit, to the UE 115-*b*, a control message that causes the UE 115-*b* to deprioritize serving cells associated with the C-band for some time interval, or until some condition is met. In this regard, the network entity 105-*b* may transmit control signaling indicating a deprioritization of serving cells associated with the C-band for cell selection procedures, cell re-selection procedures, cell handover procedures, or any combination thereof.

Conversely, in cases where the UE 115-*b* has not yet established a C-band connection, the network entity 105-*b* may delay an establishment of a wireless connection with the UE 115-*b* (e.g., during SA operation), delay an addition of a secondary node at the UE 115-*b* (e.g., during NSA operation and/or dual connectivity), or both.

Moreover, in some implementations, the UE 115-*b* may additionally or alternatively be configured to perform one or more actions to prevent or restrict access of the UE 115-*b* to the C-band. In other words, in some cases, the UE 115-*b* may act unilaterally (e.g., without explicit actions or signaling from the network entity 105-*b*) to restrict or prevent its own access to the C-band.

For example, in some implementations where the UE 115-*b* has already established a wireless connection with a serving cell associated with the C-band, the UE 115-*b* may release the wireless connection, and deprioritize serving cells associated with the C-band for cell selection procedures, cell-reselection procedures, handover procedures, or any combination thereof. Conversely, in cases where the UE 115-*b* has not yet established a C-band connection, the UE 115-*b* may bar itself from camping on a serving cell associated with the C-band for some time period, or until some condition is met. By way of another example, the UE 115-*b* may delay an establishment of a wireless connection with the UE 115-*b* (e.g., during SA operation), delay an addition of a secondary node at the UE 115-*b* (e.g., during NSA operation and/or dual connectivity), or both.

Techniques described herein may reduce or eliminate interference within the C-band at aircraft altimeters. In particular, techniques described herein may be used to identify a probability that the UE 115-*b* is positioned on aircraft, and prevent or restrict access of the UE 115-*b* to the C-band, thereby reducing (or eliminating) wireless communications of the UE 115-*b* on aircraft within the C-band. As such, techniques described herein may reduce C-band interference experienced by aircraft components even in cases where the aircraft is located outside of an exclusion zone associated with the C-band, such as during takeoff and landing. In this regard, techniques described herein may improve an efficiency of aircraft components (e.g., altimeters), and improve overall aircraft safety, while retaining the ability of the UE 115-*b* to perform NR/5G communications in and around aircraft and airports.

Figure 5:
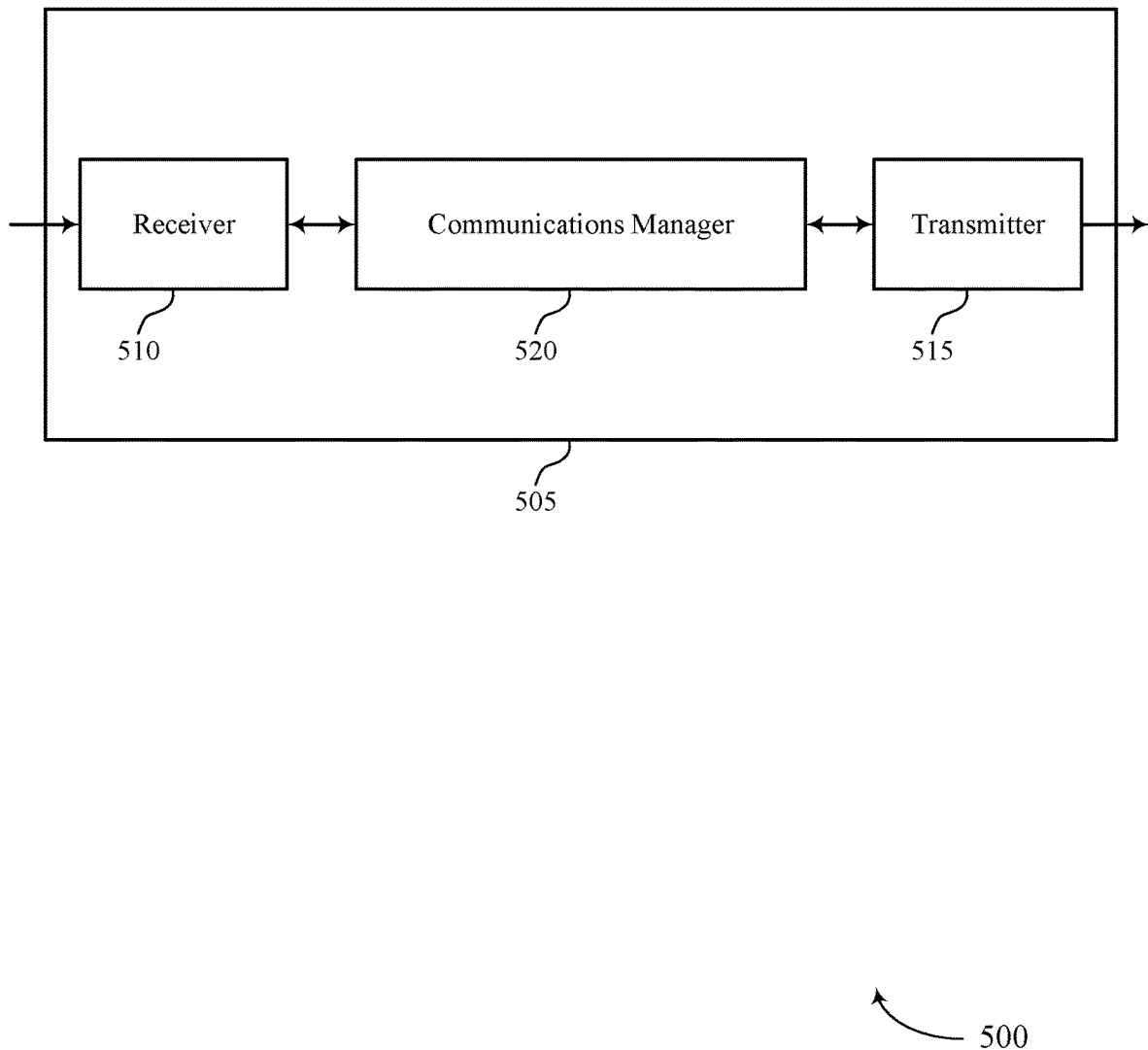
FIGS. 5 and 6 show block diagrams of devices that support techniques for restricting user equipment access to C-band in accordance with one or more aspects of the present disclosure.

FIG. 5 shows a block diagram 500 of a device 505 that supports techniques for restricting user equipment access to C-band in accordance with one or more aspects of the present disclosure. The device 505 may be an example of aspects of a network entity 105 as described herein. The device 505 may include a receiver 510, a transmitter 515, and a communications manager 520. The device 505 may also include a processor. Each of these components may be in communication with one another (e.g., via one or more buses).

The receiver 510 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 505. In some examples, the receiver 510 may support obtaining information by receiving signals via one or more antennas. Additionally, or alternatively, the receiver 510 may support obtaining information by receiving signals via one or more wired (e.g., electrical, fiber optic) interfaces, wireless interfaces, or any combination thereof.

The transmitter 515 may provide a means for outputting (e.g., transmitting, providing, conveying, sending) information generated by other components of the device 505. For example, the transmitter 515 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 515 may support outputting information by transmitting signals via one or more antennas. Additionally, or alternatively, the transmitter 515 may support outputting information by transmitting signals via one or more wired (e.g., electrical, fiber optic) interfaces, wireless interfaces, or any combination thereof. In some examples, the transmitter 515 and the receiver 510 may be co-located in a transceiver, which may include or be coupled with a modem.

The communications manager 520, the receiver 510, the transmitter 515, or various combinations thereof or various components thereof may be examples of means for performing various aspects of techniques for restricting user equipment access to C-band as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 520 may be configured to perform various operations (e.g., receiving, obtaining, monitoring, outputting, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to obtain information, output information, or perform various other operations as described herein.

The communications manager 520 may support wireless communication at a network entity in accordance with examples as disclosed herein. For example, the communications manager 520 may be configured as or otherwise support a means for receiving a report from a UE positioned outside of an exclusion zone associated with a frequency band, where the report is associated with a mobility history of the UE, measurements performed by the UE, a TAU associated with the UE, or any combination thereof. The communications manager 520 may be configured as or otherwise support a means for determining a probability that the UE is located on an aircraft based on the report. The communications manager 520 may be configured as or otherwise support a means for performing one or more actions to prevent or restrict access of the UE to the frequency band based on the probability satisfying a threshold probability.

By including or configuring the communications manager 520 in accordance with examples as described herein, the device 505 (e.g., a processor controlling or otherwise coupled with the receiver 510, the transmitter 515, the communications manager 520, or a combination thereof) may support techniques that may reduce or eliminate interference within the C-band at aircraft altimeters. In particular, techniques described herein may be used to identify UEs that are likely positioned on aircraft, and prevent or restrict access of such UEs to the C-band, thereby reducing (or eliminating) wireless communications of UEs on aircraft within the C-band. As such, techniques described herein may reduce C-band interference experienced by aircraft components even in cases where the aircraft is located outside of an exclusion zone associated with the C-band, such as during takeoff and landing. In this regard, techniques described herein may improve an efficiency of aircraft components (e.g., altimeters), and improve overall aircraft safety, while retaining the ability of UEs 115 to perform NR/5G communications in and around aircraft and airports.

Figure 6:
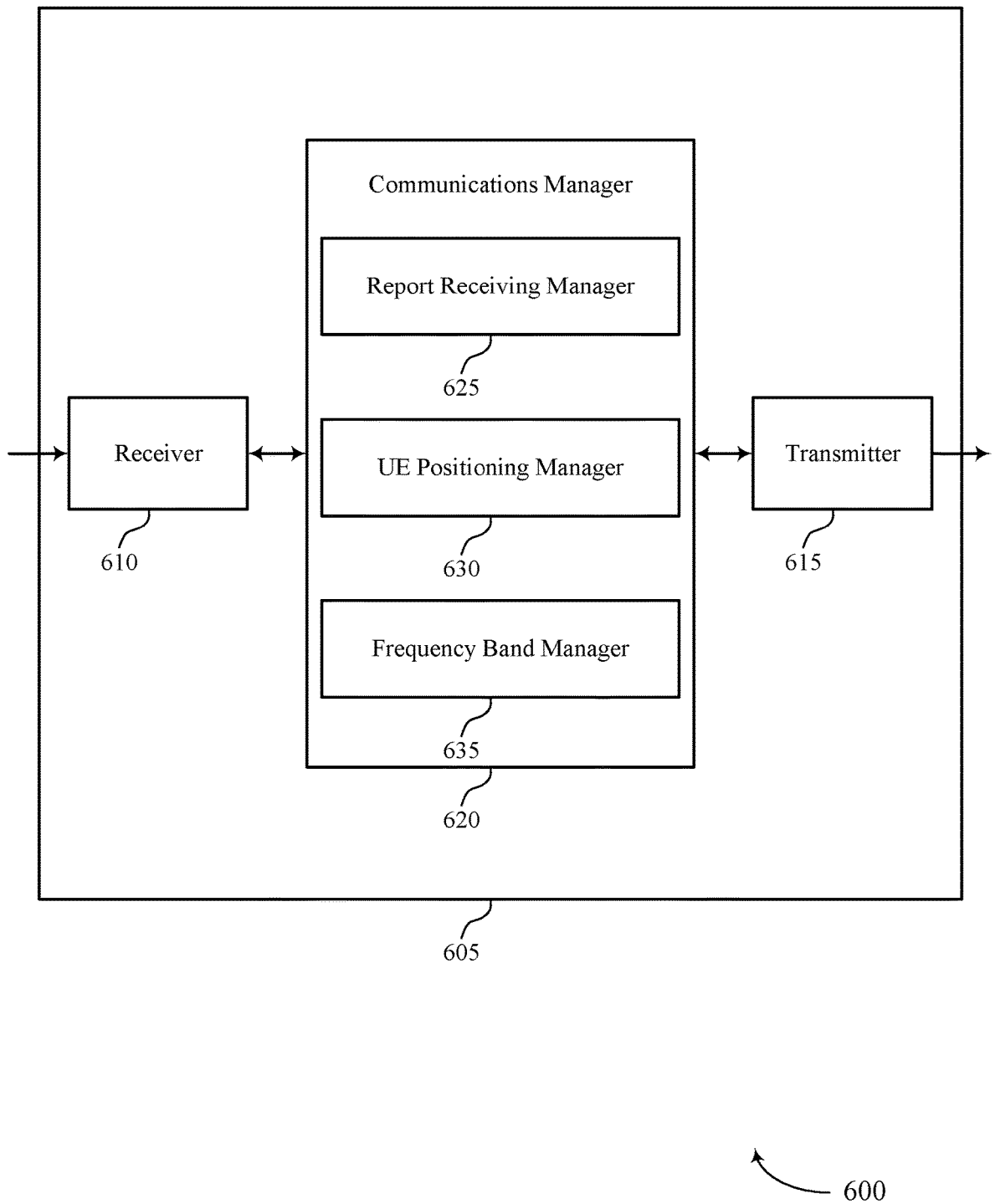

FIG. 6 shows a block diagram 600 of a device 605 that supports techniques for restricting user equipment access to C-band in accordance with one or more aspects of the present disclosure. The device 605 may be an example of aspects of a device 505 or a network entity 105 as described herein. The device 605 may include a receiver 610, a transmitter 615, and a communications manager 620. The device 605 may also include a processor. Each of these components may be in communication with one another (e.g., via one or more buses).

The receiver 610 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 605. In some examples, the receiver 610 may support obtaining information by receiving signals via one or more antennas. Additionally, or alternatively, the receiver 610 may support obtaining information by receiving signals via one or more wired (e.g., electrical, fiber optic) interfaces, wireless interfaces, or any combination thereof.

The transmitter 615 may provide a means for outputting (e.g., transmitting, providing, conveying, sending) information generated by other components of the device 605. For example, the transmitter 615 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 615 may support outputting information by transmitting signals via one or more antennas. Additionally, or alternatively, the transmitter 615 may support outputting information by transmitting signals via one or more wired (e.g., electrical, fiber optic) interfaces, wireless interfaces, or any combination thereof. In some examples, the transmitter 615 and the receiver 610 may be co-located in a transceiver, which may include or be coupled with a modem.

The device 605, or various components thereof, may be an example of means for performing various aspects of techniques for restricting user equipment access to C-band as described herein. For example, the communications manager 620 may include a report receiving manager 625, a UE positioning manager 630, a frequency band manager 635, or any combination thereof. The communications manager 620 may be an example of aspects of a communications manager 520 as described herein. In some examples, the communications manager 620, or various components thereof, may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communication at a network entity in accordance with examples as disclosed herein. The report receiving manager 625 may be configured as or otherwise support a means for receiving a report from a UE positioned outside of an exclusion zone associated with a frequency band, where the report is associated with a mobility history of the UE, measurements performed by the UE, a TAU associated with the UE, or any combination thereof. The UE positioning manager 630 may be configured as or otherwise support a means for determining a probability that the UE is located on an aircraft based on the report. The frequency band manager 635 may be configured as or otherwise support a means for performing one or more actions to prevent or restrict access of the UE to the frequency band based on the probability satisfying a threshold probability.

Figure 7:
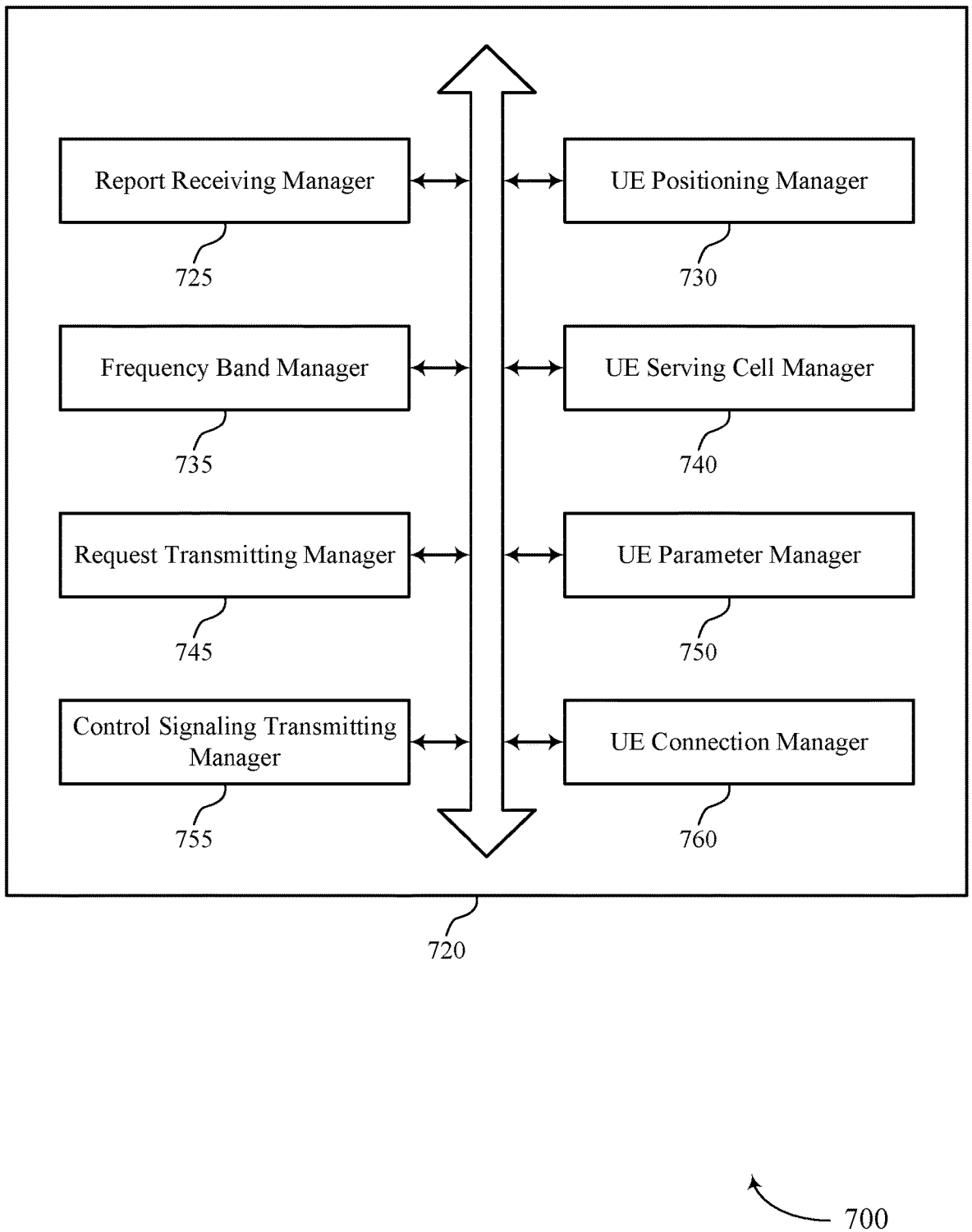
FIG. 7 shows a block diagram of a communications manager that supports techniques for restricting user equipment access to C-band in accordance with one or more aspects of the present disclosure.

FIG. 7 shows a block diagram 700 of a communications manager 720 that supports techniques for restricting user equipment access to C-band in accordance with one or more aspects of the present disclosure. The communications manager 720 may be an example of aspects of a communications manager 520, a communications manager 620, or both, as described herein. The communications manager 720, or various components thereof, may be an example of means for performing various aspects of techniques for restricting user equipment access to C-band as described herein. For example, the communications manager 720 may include a report receiving manager 725, a UE positioning manager 730, a frequency band manager 735, a UE serving cell manager 740, a request transmitting manager 745, a UE parameter manager 750, a control signaling transmitting manager 755, a UE connection manager 760, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 720 may support wireless communication at a network entity in accordance with examples as disclosed herein. The report receiving manager 725 may be configured as or otherwise support a means for receiving a report from a UE positioned outside of an exclusion zone associated with a frequency band, where the report is associated with a mobility history of the UE, measurements performed by the UE, a TAU associated with the UE, or any combination thereof. The UE positioning manager 730 may be configured as or otherwise support a means for determining a probability that the UE is located on an aircraft based on the report. The frequency band manager 735 may be configured as or otherwise support a means for performing one or more actions to prevent or restrict access of the UE to the frequency band based on the probability satisfying a threshold probability.

In some examples, the UE serving cell manager 740 may be configured as or otherwise support a means for identifying one or more serving cells with which the UE was previously connected to based on the mobility history, where determining the probability is based on the one or more serving cells. In some examples, the UE serving cell manager 740 may be configured as or otherwise support a means for identifying one or more time durations during which the UE was previously connected to the one or more serving cells based on the mobility history, where determining the probability is based on the one or more time durations.

In some examples, the request transmitting manager 745 may be configured as or otherwise support a means for transmitting a request for the report, where receiving the report is based on the request.

In some examples, the UE serving cell manager 740 may be configured as or otherwise support a means for identifying that the UE has established a wireless connection with a serving cell associated with the frequency band, where transmitting the request is based on identifying that the UE has established the wireless connection.

In some examples, the report receiving manager 725 may be configured as or otherwise support a means for receiving, via the report, an indication of a time at which a last mobility history report was transmitted by the UE, where determining the probability is based on the indication of the time.

In some examples, the measurements performed by the UE include RSRP measurements, RSRQ measurements, or both, associated with reference signals received from one or more serving cells communicatively couplable to the UE. In some examples, determining the probability is based on the RSRP measurements, the RSRQ measurements, or both. In some examples, the measurements may be associated with one or more of an idle operational mode of the UE, an inactive operational mode of the UE, and a connected operational mode of the UE.

In some examples, the UE parameter manager 750 may be configured as or otherwise support a means for determining a location of the UE, a speed of the UE, a path of the UE, or any combination thereof, based on the report, where determining the probability is based on the location, the speed, the path, or any combination thereof.

In some examples, the control signaling transmitting manager 755 may be configured as or otherwise support a means for transmitting, to the UE, control signaling indicating one or more trigger conditions for transmitting reports associated with the frequency band, where receiving the report is based on the control signaling.

In some examples, the UE parameter manager 750 may be configured as or otherwise support a means for determining an altitude associated with the UE based on the report, where determining the probability is based on the altitude.

In some examples, the report receiving manager 725 may be configured as or otherwise support a means for receiving, via the report, a TAU associated with the UE, a TAI associated with the UE, or both, where determining the probability is based on the TAU, the TAI, or both.

In some examples, the UE serving cell manager 740 may be configured as or otherwise support a means for identifying one or more tracking areas in which the UE was previously positioned based on the TAU, where determining the probability is based on the one or more tracking areas. In some examples, the UE serving cell manager 740 may be configured as or otherwise support a means for identifying one or more time durations during which the UE was previously positioned within the one or more tracking areas based on the TAU, where determining the probability is based on the one or more time durations.

In some examples, to support performing the one or more actions, the control signaling transmitting manager 755 may be configured as or otherwise support a means for transmitting, to the UE, a SIB message including a barring parameter associated with a prohibition for camping on serving cells associated with the frequency band.

In some examples, to support performing the one or more actions, the UE connection manager 760 may be configured as or otherwise support a means for releasing a wireless connection between the UE and a serving cell associated with the frequency band. In some examples, to support performing the one or more actions, the control signaling transmitting manager 755 may be configured as or otherwise support a means for transmitting, to the UE based on releasing the wireless connection, a control message that deprioritizes serving cells associated with the frequency band for a time interval.

In some examples, to support performing the one or more actions, the UE connection manager 760 may be configured as or otherwise support a means for delaying an establishment of a wireless connection with the UE, an addition of a secondary node at the UE, or both.

In some examples, the control signaling transmitting manager 755 may be configured as or otherwise support a means for transmitting control signaling indicating a deprioritization of serving cells associated with the frequency band for cell selection procedures, cell re-selection procedures, handover procedures, or any combination thereof, where performing the one or more actions is based on the control signaling.

In some examples, the frequency band includes at least a portion of a C-band. In some examples, the frequency band includes at least a portion of a frequency range between 3.7 GHz and 3.98 GHz. In some examples, the exclusion zone includes a geographical area associated with an airport in which wireless communication within the frequency band is restricted or prohibited.

Figure 8:
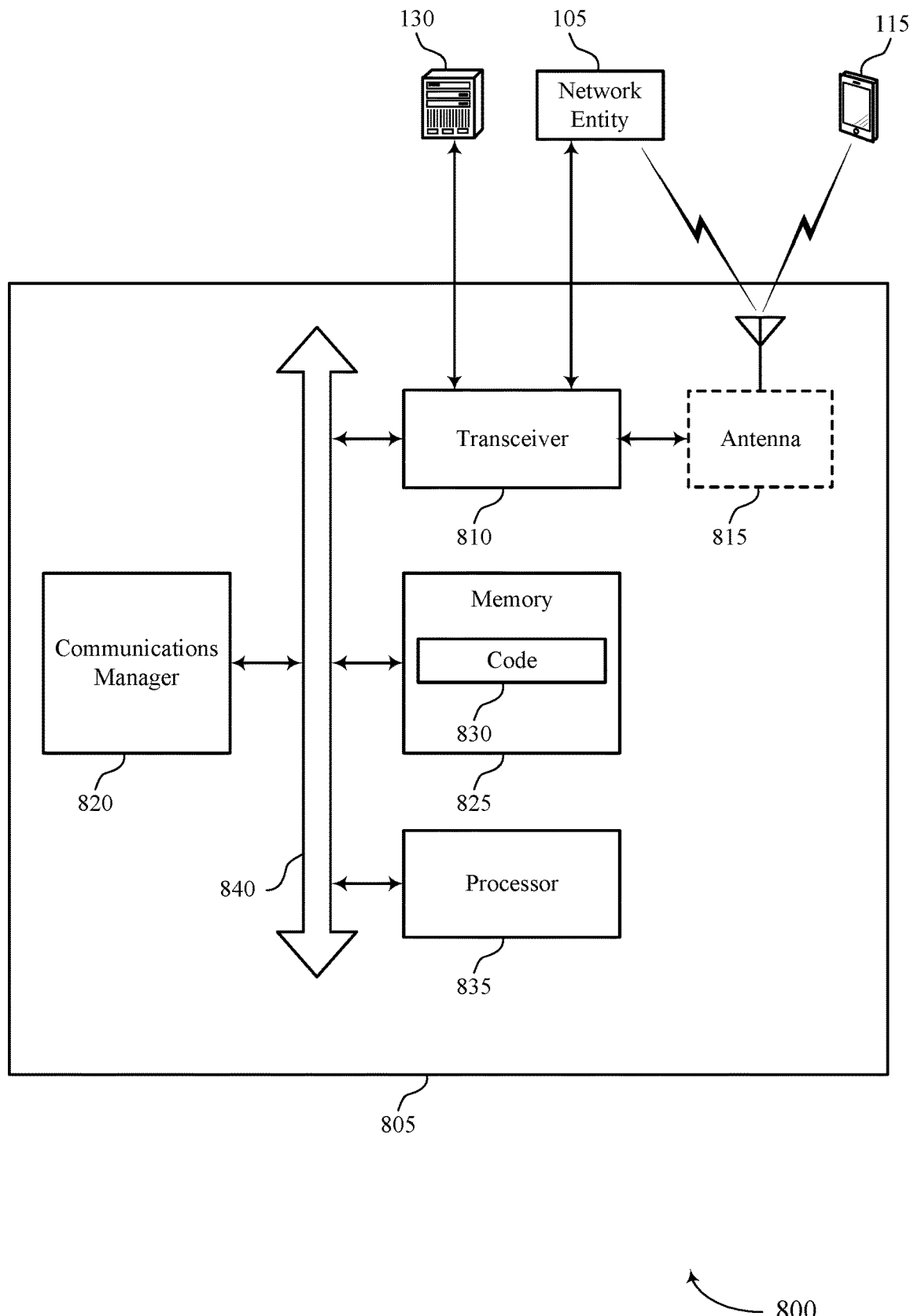
FIG. 8 shows a diagram of a system including a device that supports techniques for restricting user equipment access to C-band in accordance with one or more aspects of the present disclosure.

FIG. 8 shows a diagram of a system 800 including a device 805 that supports techniques for restricting user equipment access to C-band in accordance with one or more aspects of the present disclosure. The device 805 may be an example of or include the components of a device 505, a device 605, or a network entity 105 as described herein. The device 805 may communicate with one or more network entities 105, one or more UEs 115, or any combination thereof, which may include communications over one or more wired interfaces, over one or more wireless interfaces, or any combination thereof. The device 805 may include components that support outputting and obtaining communications, such as a communications manager 820, a transceiver 810, an antenna 815, a memory 825, code 830, and a processor 835. These components may be in electronic communication or otherwise coupled (e.g., operatively, communicatively, functionally, electronically, electrically) via one or more buses (e.g., a bus 840).

The transceiver 810 may support bi-directional communications via wired links, wireless links, or both as described herein. In some examples, the transceiver 810 may include a wired transceiver and may communicate bi-directionally with another wired transceiver. Additionally, or alternatively, in some examples, the transceiver 810 may include a wireless transceiver and may communicate bi-directionally with another wireless transceiver. In some examples, the device 805 may include one or more antennas 815, which may be capable of transmitting or receiving wireless transmissions (e.g., concurrently). The transceiver 810 may also include a modem to modulate signals, to provide the modulated signals for transmission (e.g., by one or more antennas 815, by a wired transmitter), to receive modulated signals (e.g., from one or more antennas 815, from a wired receiver), and to demodulate signals. The transceiver 810, or the transceiver 810 and one or more antennas 815 or wired interfaces, where applicable, may be an example of a transmitter 515, a transmitter 615, a receiver 510, a receiver 610, or any combination thereof or component thereof, as described herein. In some examples, the transceiver may be operable to support communications via one or more communications links (e.g., a communication link 125, a backhaul communication link 120, a midhaul communication link 162, a fronthaul communication link 168).

The memory 825 may include RAM and ROM. The memory 825 may store computer-readable, computer-executable code 830 including instructions that, when executed by the processor 835, cause the device 805 to perform various functions described herein. The code 830 may be stored in a non-transitory computer-readable medium such as system memory or another type of memory. In some cases, the code 830 may not be directly executable by the processor 835 but may cause a computer (e.g., when compiled and executed) to perform functions described herein. In some cases, the memory 825 may contain, among other things, a BIOS which may control basic hardware or software operation such as the interaction with peripheral components or devices.

The processor 835 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 835 may be configured to operate a memory array using a memory controller. In some other cases, a memory controller may be integrated into the processor 835. The processor 835 may be configured to execute computer-readable instructions stored in a memory (e.g., the memory 825) to cause the device 805 to perform various functions (e.g., functions or tasks supporting techniques for restricting user equipment access to C-band). For example, the device 805 or a component of the device 805 may include a processor 835 and memory 825 coupled with the processor 835, the processor 835 and memory 825 configured to perform various functions described herein. The processor 835 may be an example of a cloud-computing platform (e.g., one or more physical nodes and supporting software such as operating systems, virtual machines, or container instances) that may host the functions (e.g., by executing code 830) to perform the functions of the device 805.

In some examples, a bus 840 may support communications of (e.g., within) a protocol layer of a protocol stack. In some examples, a bus 840 may support communications associated with a logical channel of a protocol stack (e.g., between protocol layers of a protocol stack), which may include communications performed within a component of the device 805, or between different components of the device 805 that may be co-located or located in different locations (e.g., where the device 805 may refer to a system in which one or more of the communications manager 820, the transceiver 810, the memory 825, the code 830, and the processor 835 may be located in one of the different components or divided between different components).

In some examples, the communications manager 820 may manage aspects of communications with a core network 130 (e.g., via one or more wired or wireless backhaul links). For example, the communications manager 820 may manage the transfer of data communications for client devices, such as one or more UEs 115. In some examples, the communications manager 820 may manage communications with other network entities 105, and may include a controller or scheduler for controlling communications with UEs 115 in cooperation with other network entities 105. In some examples, the communications manager 820 may support an X2 interface within an LTE/LTE-A wireless communications network technology to provide communication between network entities 105.

The communications manager 820 may support wireless communication at a network entity in accordance with examples as disclosed herein. For example, the communications manager 820 may be configured as or otherwise support a means for receiving a report from a UE positioned outside of an exclusion zone associated with a frequency band, where the report is associated with a mobility history of the UE, measurements performed by the UE, a TAU associated with the UE, or any combination thereof. The communications manager 820 may be configured as or otherwise support a means for determining a probability that the UE is located on an aircraft based on the report. The communications manager 820 may be configured as or otherwise support a means for performing one or more actions to prevent or restrict access of the UE to the frequency band based on the probability satisfying a threshold probability.

By including or configuring the communications manager 820 in accordance with examples as described herein, the device 805 may support techniques that may reduce or eliminate interference within the C-band at aircraft altimeters. In particular, techniques described herein may be used to identify UEs that are likely positioned on aircraft, and prevent or restrict access of such UEs to the C-band, thereby reducing (or eliminating) wireless communications of UEs on aircraft within the C-band. As such, techniques described herein may reduce C-band interference experienced by aircraft components even in cases where the aircraft is located outside of an exclusion zone associated with the C-band, such as during takeoff and landing. In this regard, techniques described herein may improve an efficiency of aircraft components (e.g., altimeters), and improve overall aircraft safety, while retaining the ability of UEs 115 to perform NR/5G communications in and around aircraft and airports.

In some examples, the communications manager 820 may be configured to perform various operations (e.g., receiving, obtaining, monitoring, outputting, transmitting) using or otherwise in cooperation with the transceiver 810, the one or more antennas 815 (e.g., where applicable), or any combination thereof. Although the communications manager 820 is illustrated as a separate component, in some examples, one or more functions described with reference to the communications manager 820 may be supported by or performed by the processor 835, the memory 825, the code 830, the transceiver 810, or any combination thereof. For example, the code 830 may include instructions executable by the processor 835 to cause the device 805 to perform various aspects of techniques for restricting user equipment access to C-band as described herein, or the processor 835 and the memory 825 may be otherwise configured to perform or support such operations.

Figure 9:
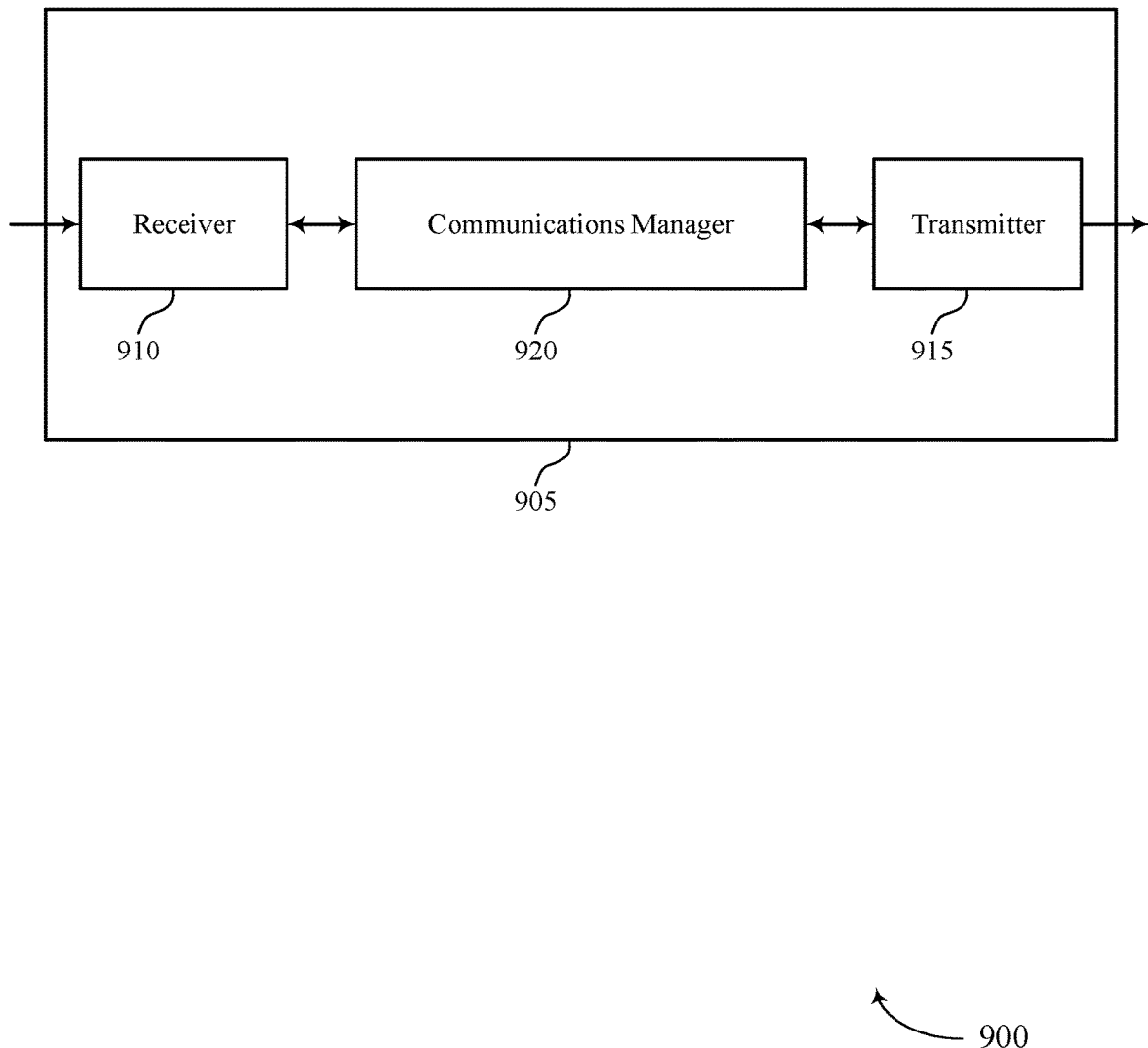
FIGS. 9 and 10 show block diagrams of devices that support techniques for restricting user equipment access to C-band in accordance with one or more aspects of the present disclosure.

FIG. 9 shows a block diagram 900 of a device 905 that supports techniques for restricting user equipment access to C-band in accordance with one or more aspects of the present disclosure. The device 905 may be an example of aspects of a UE 115 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to techniques for restricting user equipment access to C-band). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to techniques for restricting user equipment access to C-band). In some examples, the transmitter 915 may be co-located with a receiver 910 in a transceiver module. The transmitter 915 may utilize a single antenna or a set of multiple antennas.

The communications manager 920, the receiver 910, the transmitter 915, or various combinations thereof or various components thereof may be examples of means for performing various aspects of techniques for restricting user equipment access to C-band as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 920 may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The communications manager 920 may support wireless communication at a UE in accordance with examples as disclosed herein. For example, the communications manager 920 may be configured as or otherwise support a means for obtaining information associated with the UE, the information including a mobility history of the UE, measurements performed by the UE, a TAU associated with the UE, or any combination thereof, where the UE is positioned outside of an exclusion zone associated with a frequency band. The communications manager 920 may be configured as or otherwise support a means for determining a probability that the UE is located on an aircraft based on the information. The communications manager 920 may be configured as or otherwise support a means for performing one or more actions to prevent or restrict access of the UE to the frequency band based on the probability satisfying a threshold probability.

By including or configuring the communications manager 920 in accordance with examples as described herein, the device 905 (e.g., a processor controlling or otherwise coupled with the receiver 910, the transmitter 915, the communications manager 920, or a combination thereof) may support techniques that may reduce or eliminate interference within the C-band at aircraft altimeters. In particular, techniques described herein may be used to identify UEs 115 that are likely positioned on aircraft, and prevent or restrict access of such UEs 115 to the C-band, thereby reducing (or eliminating) wireless communications of UEs 115 on aircraft within the C-band. As such, techniques described herein may reduce C-band interference experienced by aircraft components even in cases where the aircraft is located outside of an exclusion zone associated with the C-band, such as during takeoff and landing. In this regard, techniques described herein may improve an efficiency of aircraft components (e.g., altimeters), and improve overall aircraft safety, while retaining the ability of UEs 115 to perform NR/5G communications in and around aircraft and airports.

Figure 10:
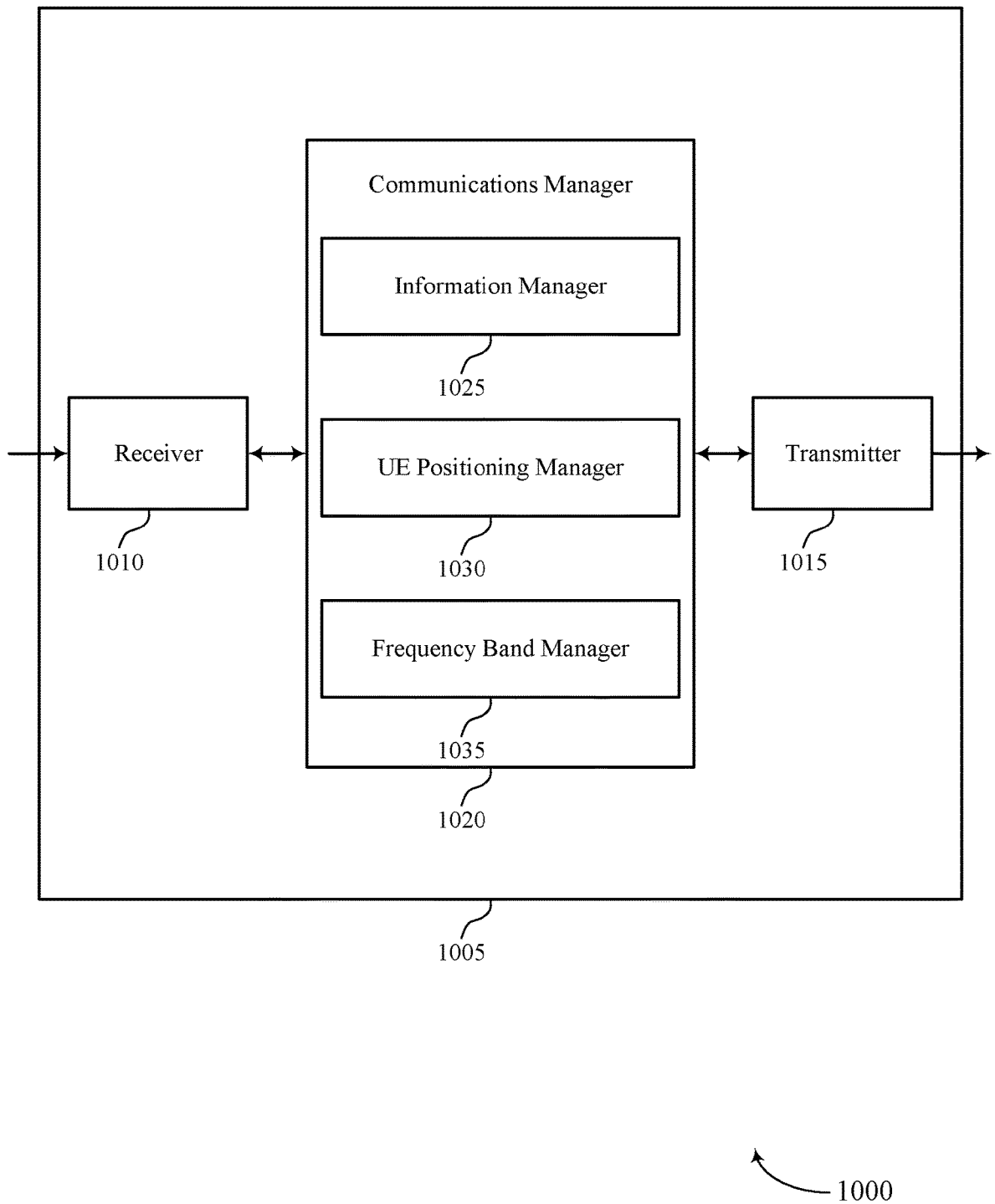

FIG. 10 shows a block diagram 1000 of a device 1005 that supports techniques for restricting user equipment access to C-band in accordance with one or more aspects of the present disclosure. The device 1005 may be an example of aspects of a device 905 or a UE 115 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to techniques for restricting user equipment access to C-band). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to techniques for restricting user equipment access to C-band). In some examples, the transmitter 1015 may be co-located with a receiver 1010 in a transceiver module. The transmitter 1015 may utilize a single antenna or a set of multiple antennas.

The device 1005, or various components thereof, may be an example of means for performing various aspects of techniques for restricting user equipment access to C-band as described herein. For example, the communications manager 1020 may include an information manager 1025, a UE positioning manager 1030, a frequency band manager 1035, or any combination thereof. The communications manager 1020 may be an example of aspects of a communications manager 920 as described herein. In some examples, the communications manager 1020, or various components thereof, may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communication at a UE in accordance with examples as disclosed herein. The information manager 1025 may be configured as or otherwise support a means for obtaining information associated with the UE, the information including a mobility history of the UE, measurements performed by the UE, a TAU associated with the UE, or any combination thereof, where the UE is positioned outside of an exclusion zone associated with a frequency band. The UE positioning manager 1030 may be configured as or otherwise support a means for determining a probability that the UE is located on an aircraft based on the information. The frequency band manager 1035 may be configured as or otherwise support a means for performing one or more actions to prevent or restrict access of the UE to the frequency band based on the probability satisfying a threshold probability.

Figure 11:
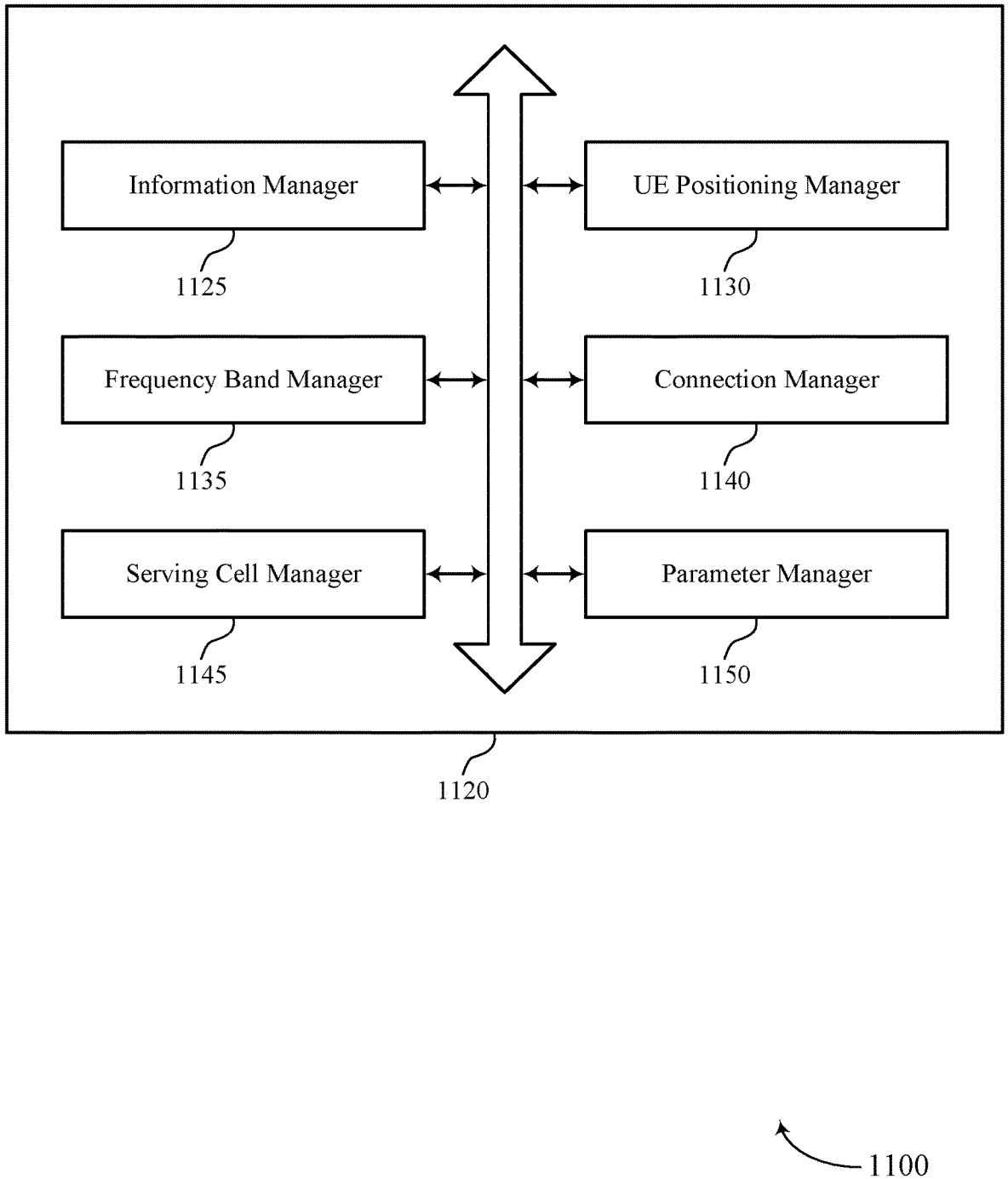
FIG. 11 shows a block diagram of a communications manager that supports techniques for restricting user equipment access to C-band in accordance with one or more aspects of the present disclosure.

FIG. 11 shows a block diagram 1100 of a communications manager 1120 that supports techniques for restricting user equipment access to C-band in accordance with one or more aspects of the present disclosure. The communications manager 1120 may be an example of aspects of a communications manager 920, a communications manager 1020, or both, as described herein. The communications manager 1120, or various components thereof, may be an example of means for performing various aspects of techniques for restricting user equipment access to C-band as described herein. For example, the communications manager 1120 may include an information manager 1125, a UE positioning manager 1130, a frequency band manager 1135, a connection manager 1140, a serving cell manager 1145, a parameter manager 1150, or any combination thereof. Each of these components may communicate, directly or indirectly, with one another (e.g., via one or more buses).

The communications manager 1120 may support wireless communication at a UE in accordance with examples as disclosed herein. The information manager 1125 may be configured as or otherwise support a means for obtaining information associated with the UE, the information including a mobility history of the UE, measurements performed by the UE, a TAU associated with the UE, or any combination thereof, where the UE is positioned outside of an exclusion zone associated with a frequency band. The UE positioning manager 1130 may be configured as or otherwise support a means for determining a probability that the UE is located on an aircraft based on the information. The frequency band manager 1135 may be configured as or otherwise support a means for performing one or more actions to prevent or restrict access of the UE to the frequency band based on the probability satisfying a threshold probability.

In some examples, to support performing the one or more actions, the connection manager 1140 may be configured as or otherwise support a means for releasing a wireless connection with a serving cell associated with the frequency band. In some examples, to support performing the one or more actions, the serving cell manager 1145 may be configured as or otherwise support a means for deprioritizing serving cells associated with the frequency band for cell selection procedures, cell re-selection procedures, handover procedures, or any combination thereof.

In some examples, the serving cell manager 1145 may be configured as or otherwise support a means for identifying one or more serving cells with which the UE was previously connected to based on the mobility history, where determining the probability is based on the one or more serving cells. In some examples, the serving cell manager 1145 may be configured as or otherwise support a means for identifying one or more time durations during which the UE was previously connected to the one or more serving cells based on the mobility history, where determining the probability is based on the one or more time durations.

In some examples, the measurements performed by the UE include RSRP measurements, RSRQ measurements, or both, associated with reference signals received from one or more serving cells communicatively couplable to the UE. In some examples, determining the probability is based on the RSRP measurements, the RSRQ measurements, or both.

In some examples, the parameter manager 1150 may be configured as or otherwise support a means for determining a location of the UE, a speed of the UE, a path of the UE, or any combination thereof, based on the information, where determining the probability is based on the location, the speed, the path, or any combination thereof.

In some examples, the parameter manager 1150 may be configured as or otherwise support a means for determining an altitude associated with the UE based on the information, where determining the probability is based on the altitude.

In some examples, the serving cell manager 1145 may be configured as or otherwise support a means for identifying one or more tracking areas in which the UE was previously positioned based on the TAU, where determining the probability is based on the one or more tracking areas. In some examples, the serving cell manager 1145 may be configured as or otherwise support a means for identifying one or more time durations during which the UE was previously positioned within the one or more tracking areas based on the TAU, where determining the probability is based on the one or more time durations.

In some examples, the frequency band includes at least a portion of a C-band. In some examples, the frequency band includes at least a portion of a frequency range between 3.7 GHz and 3.98 GHz. In some examples, the exclusion zone includes a geographical area associated with an airport in which wireless communication within the frequency band is restricted or prohibited.

Figure 12:
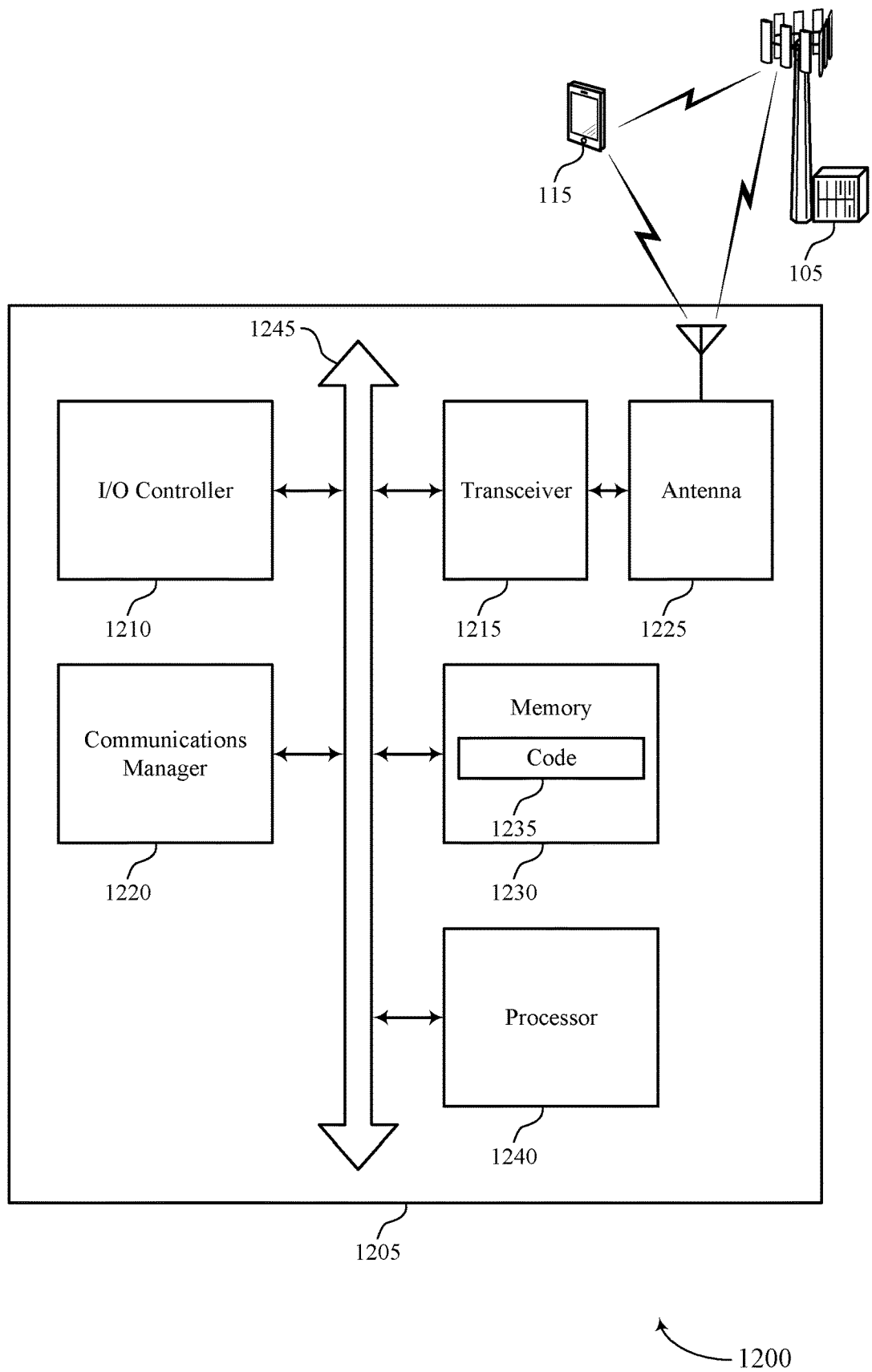
FIG. 12 shows a diagram of a system including a device that supports techniques for restricting user equipment access to C-band in accordance with one or more aspects of the present disclosure.

FIG. 12 shows a diagram of a system 1200 including a device 1205 that supports techniques for restricting user equipment access to C-band in accordance with one or more aspects of the present disclosure. The device 1205 may be an example of or include the components of a device 905, a device 1005, or a UE 115 as described herein. The device 1205 may communicate (e.g., wirelessly) with one or more network entities 105, one or more UEs 115, or any combination thereof. The device 1205 may include components for bi-directional voice and data communications including components for transmitting and receiving communications, such as a communications manager 1220, an input/output (I/O) controller 1210, a transceiver 1215, an antenna 1225, a memory 1230, code 1235, and a processor 1240. These components may be in electronic communication or otherwise coupled (e.g., operatively, communicatively, functionally, electronically, electrically) via one or more buses (e.g., a bus 1245).

The I/O controller 1210 may manage input and output signals for the device 1205. The I/O controller 1210 may also manage peripherals not integrated into the device 1205. In some cases, the I/O controller 1210 may represent a physical connection or port to an external peripheral. In some cases, the I/O controller 1210 may utilize an operating system such as iOS®, ANDROID®, MS-DOS®, MS-WINDOWS®, OS/2®, UNIX®, LINUX®, or another known operating system. Additionally or alternatively, the I/O controller 1210 may represent or interact with a modem, a keyboard, a mouse, a touchscreen, or a similar device. In some cases, the I/O controller 1210 may be implemented as part of a processor, such as the processor 1240. In some cases, a user may interact with the device 1205 via the I/O controller 1210 or via hardware components controlled by the I/O controller 1210.

In some cases, the device 1205 may include a single antenna 1225. However, in some other cases, the device 1205 may have more than one antenna 1225, which may be capable of concurrently transmitting or receiving multiple wireless transmissions. The transceiver 1215 may communicate bi-directionally, via the one or more antennas 1225, wired, or wireless links as described herein. For example, the transceiver 1215 may represent a wireless transceiver and may communicate bi-directionally with another wireless transceiver. The transceiver 1215 may also include a modem to modulate the packets, to provide the modulated packets to one or more antennas 1225 for transmission, and to demodulate packets received from the one or more antennas 1225. The transceiver 1215, or the transceiver 1215 and one or more antennas 1225, may be an example of a transmitter 915, a transmitter 1015, a receiver 910, a receiver 1010, or any combination thereof or component thereof, as described herein.

The memory 1230 may include random access memory (RAM) and read-only memory (ROM). The memory 1230 may store computer-readable, computer-executable code 1235 including instructions that, when executed by the processor 1240, cause the device 1205 to perform various functions described herein. The code 1235 may be stored in a non-transitory computer-readable medium such as system memory or another type of memory. In some cases, the code 1235 may not be directly executable by the processor 1240 but may cause a computer (e.g., when compiled and executed) to perform functions described herein. In some cases, the memory 1230 may contain, among other things, a basic I/O system (BIOS) which may control basic hardware or software operation such as the interaction with peripheral components or devices.

The processor 1240 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting techniques for restricting user equipment access to C-band). For example, the device 1205 or a component of the device 1205 may include a processor 1240 and memory 1230 coupled with or to the processor 1240, the processor 1240 and memory 1230 configured to perform various functions described herein.

The communications manager 1220 may support wireless communication at a UE in accordance with examples as disclosed herein. For example, the communications manager 1220 may be configured as or otherwise support a means for obtaining information associated with the UE, the information including a mobility history of the UE, measurements performed by the UE, a TAU associated with the UE, or any combination thereof, where the UE is positioned outside of an exclusion zone associated with a frequency band. The communications manager 1220 may be configured as or otherwise support a means for determining a probability that the UE is located on an aircraft based on the information. The communications manager 1220 may be configured as or otherwise support a means for performing one or more actions to prevent or restrict access of the UE to the frequency band based on the probability satisfying a threshold probability.

By including or configuring the communications manager 1220 in accordance with examples as described herein, the device 1205 may support techniques that may reduce or eliminate interference within the C-band at aircraft altimeters. In particular, techniques described herein may be used to identify UEs that are likely positioned on aircraft, and prevent or restrict access of such UEs to the C-band, thereby reducing (or eliminating) wireless communications of UEs on aircraft within the C-band. As such, techniques described herein may reduce C-band interference experienced by aircraft components even in cases where the aircraft is located outside of an exclusion zone associated with the C-band, such as during takeoff and landing. In this regard, techniques described herein may improve an efficiency of aircraft components (e.g., altimeters), and improve overall aircraft safety, while retaining the ability of UEs 115 to perform NR/5G communications in and around aircraft and airports.

In some examples, the communications manager 1220 may be configured to perform various operations (e.g., receiving, monitoring, transmitting) using or otherwise in cooperation with the transceiver 1215, the one or more antennas 1225, or any combination thereof. Although the communications manager 1220 is illustrated as a separate component, in some examples, one or more functions described with reference to the communications manager 1220 may be supported by or performed by the processor 1240, the memory 1230, the code 1235, or any combination thereof. For example, the code 1235 may include instructions executable by the processor 1240 to cause the device 1205 to perform various aspects of techniques for restricting user equipment access to C-band as described herein, or the processor 1240 and the memory 1230 may be otherwise configured to perform or support such operations.

Figure 13:
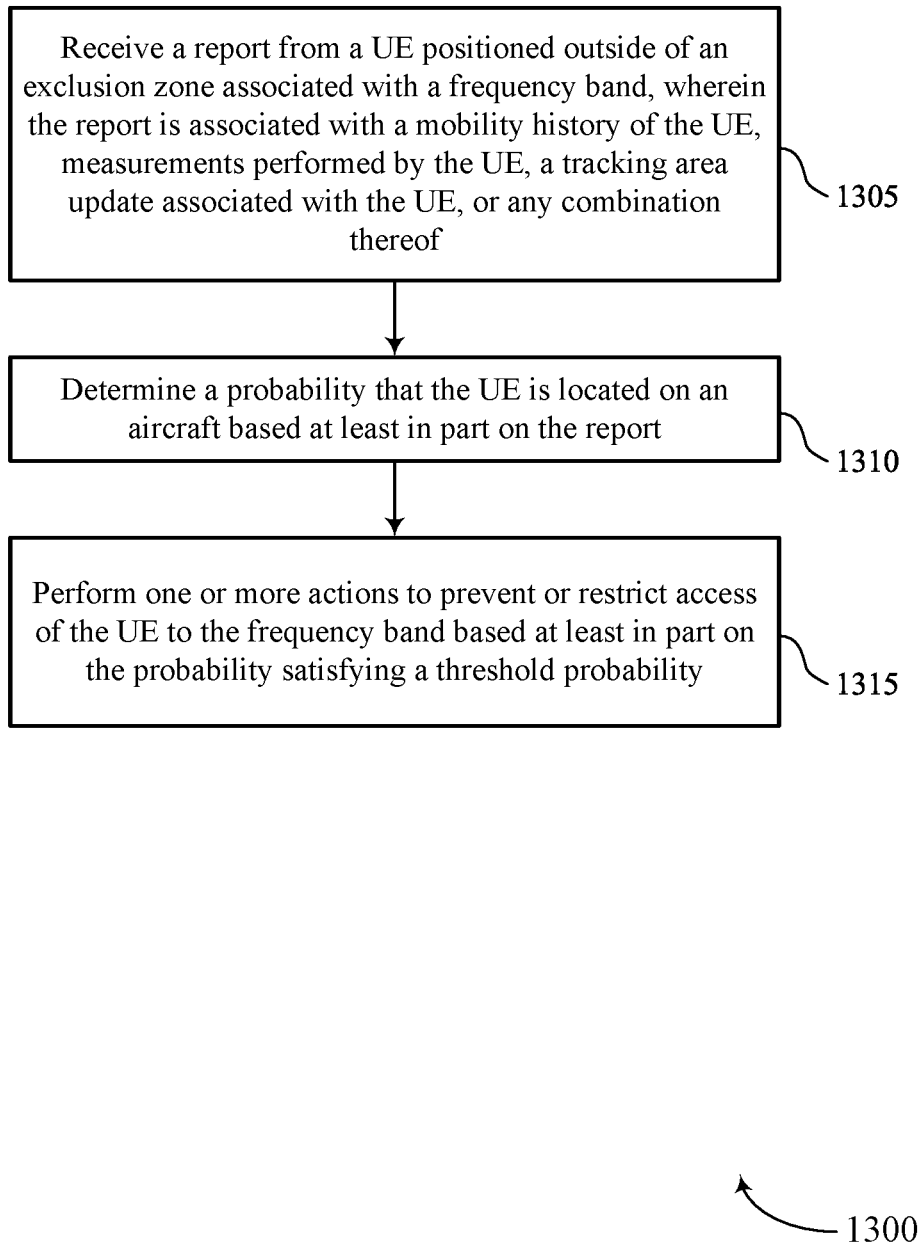
FIGS. 13 through 16 show flowcharts illustrating methods that support techniques for restricting user equipment access to C-band in accordance with one or more aspects of the present disclosure.

FIG. 13 shows a flowchart illustrating a method 1300 that supports techniques for restricting user equipment access to C-band in accordance with one or more aspects of the present disclosure. The operations of the method 1300 may be implemented by a network entity or its components as described herein. For example, the operations of the method 1300 may be performed by a network entity as described with reference to FIGS. 1 through 8. In some examples, a network entity may execute a set of instructions to control the functional elements of the network entity to perform the described functions. Additionally, or alternatively, the network entity may perform aspects of the described functions using special-purpose hardware.

At 1305, the method may include receiving a report from a UE positioned outside of an exclusion zone associated with a frequency band, where the report is associated with a mobility history of the UE, measurements performed by the UE, a TAU associated with the UE, or any combination thereof. The operations of 1305 may be performed in accordance with examples as disclosed herein. In some examples, aspects of the operations of 1305 may be performed by a report receiving manager 725 as described with reference to FIG. 7.

At 1310, the method may include determining a probability that the UE is located on an aircraft based on the report. The operations of 1310 may be performed in accordance with examples as disclosed herein. In some examples, aspects of the operations of 1310 may be performed by a UE positioning manager 730 as described with reference to FIG. 7.

At 1315, the method may include performing one or more actions to prevent or restrict access of the UE to the frequency band based on the probability satisfying a threshold probability. The operations of 1315 may be performed in accordance with examples as disclosed herein. In some examples, aspects of the operations of 1315 may be performed by a frequency band manager 735 as described with reference to FIG. 7.

Figure 14:
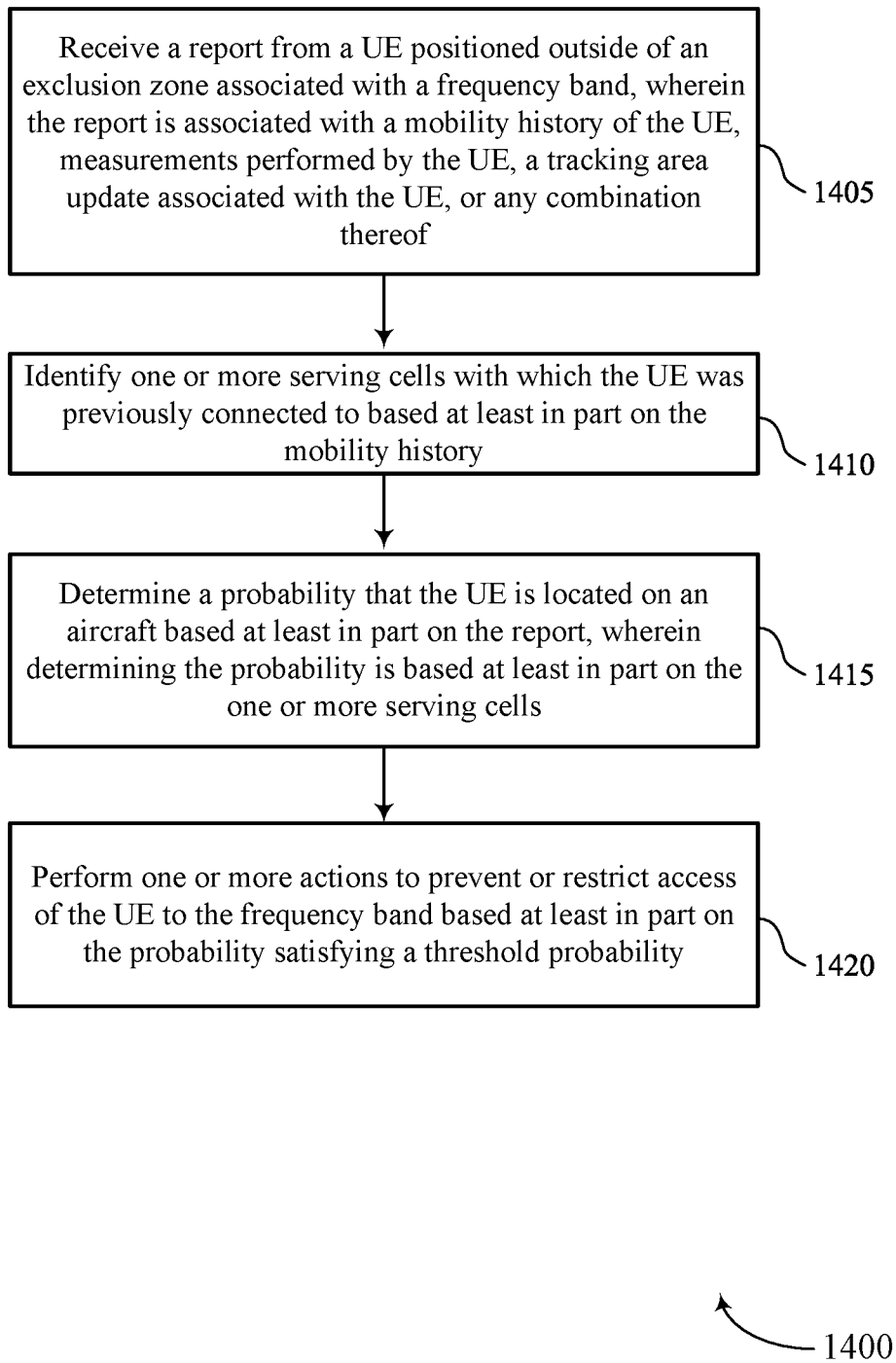

FIG. 14 shows a flowchart illustrating a method 1400 that supports techniques for restricting user equipment access to C-band in accordance with one or more aspects of the present disclosure. The operations of the method 1400 may be implemented by a network entity or its components as described herein. For example, the operations of the method 1400 may be performed by a network entity as described with reference to FIGS. 1 through 8. In some examples, a network entity may execute a set of instructions to control the functional elements of the network entity to perform the described functions. Additionally, or alternatively, the network entity may perform aspects of the described functions using special-purpose hardware.

At 1405, the method may include receiving a report from a UE positioned outside of an exclusion zone associated with a frequency band, where the report is associated with a mobility history of the UE, measurements performed by the UE, a TAU associated with the UE, or any combination thereof. The operations of 1405 may be performed in accordance with examples as disclosed herein. In some examples, aspects of the operations of 1405 may be performed by a report receiving manager 725 as described with reference to FIG. 7.

At 1410, the method may include identifying one or more serving cells with which the UE was previously connected to based on the mobility history. The operations of 1410 may be performed in accordance with examples as disclosed herein. In some examples, aspects of the operations of 1410 may be performed by a UE serving cell manager 740 as described with reference to FIG. 7.

At 1415, the method may include determining a probability that the UE is located on an aircraft based on the report, where determining the probability is based on the one or more serving cells. The operations of 1415 may be performed in accordance with examples as disclosed herein. In some examples, aspects of the operations of 1415 may be performed by a UE positioning manager 730 as described with reference to FIG. 7.

At 1420, the method may include performing one or more actions to prevent or restrict access of the UE to the frequency band based on the probability satisfying a threshold probability. The operations of 1420 may be performed in accordance with examples as disclosed herein. In some examples, aspects of the operations of 1420 may be performed by a frequency band manager 735 as described with reference to FIG. 7.

Figure 15:
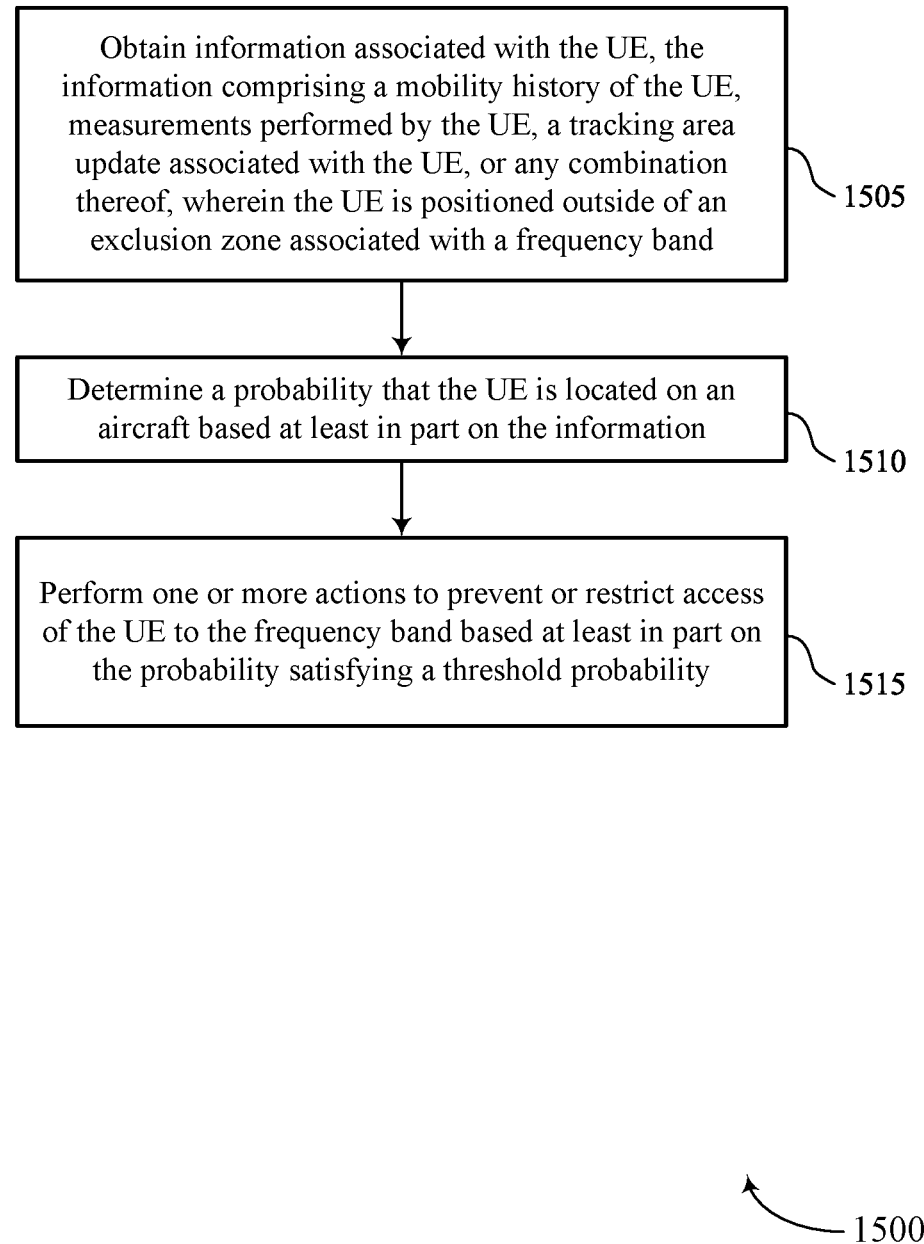

FIG. 15 shows a flowchart illustrating a method 1500 that supports techniques for restricting user equipment access to C-band in accordance with one or more aspects of the present disclosure. The operations of the method 1500 may be implemented by a UE or its components as described herein. For example, the operations of the method 1500 may be performed by a UE 115 as described with reference to FIGS. 1 through 4 and 9 through 12. In some examples, a UE may execute a set of instructions to control the functional elements of the UE to perform the described functions. Additionally, or alternatively, the UE may perform aspects of the described functions using special-purpose hardware.

At 1505, the method may include obtaining information associated with the UE, the information including a mobility history of the UE, measurements performed by the UE, a TAU associated with the UE, or any combination thereof, where the UE is positioned outside of an exclusion zone associated with a frequency band. The operations of 1505 may be performed in accordance with examples as disclosed herein. In some examples, aspects of the operations of 1505 may be performed by an information manager 1125 as described with reference to FIG. 11.

At 1510, the method may include determining a probability that the UE is located on an aircraft based on the information. The operations of 1510 may be performed in accordance with examples as disclosed herein. In some examples, aspects of the operations of 1510 may be performed by a UE positioning manager 1130 as described with reference to FIG. 11.

At 1515, the method may include performing one or more actions to prevent or restrict access of the UE to the frequency band based on the probability satisfying a threshold probability. The operations of 1515 may be performed in accordance with examples as disclosed herein. In some examples, aspects of the operations of 1515 may be performed by a frequency band manager 1135 as described with reference to FIG. 11.

Figure 16:
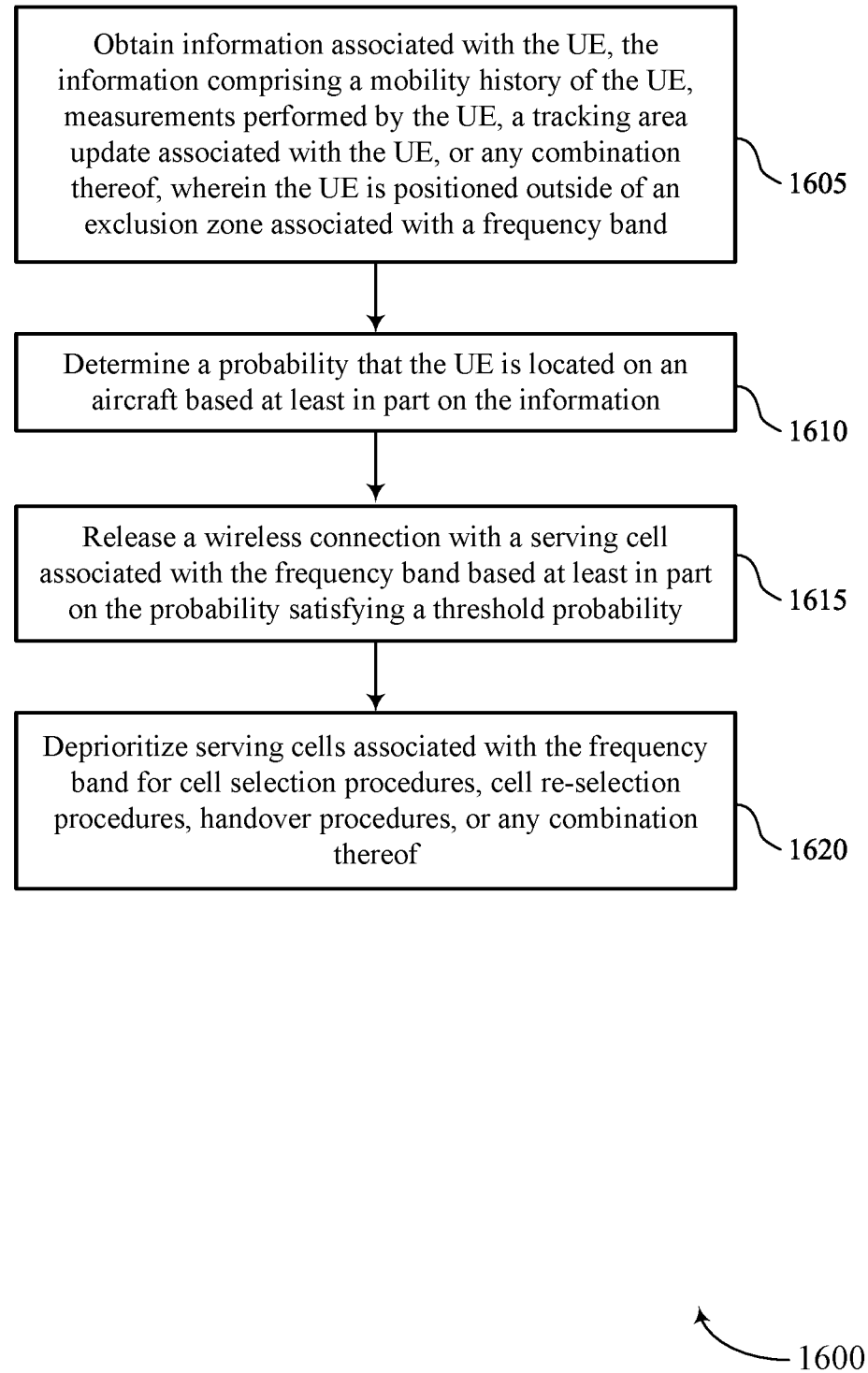

FIG. 16 shows a flowchart illustrating a method 1600 that supports techniques for restricting user equipment access to C-band in accordance with one or more aspects of the present disclosure. The operations of the method 1600 may be implemented by a UE or its components as described herein. For example, the operations of the method 1600 may be performed by a UE 115 as described with reference to FIGS. 1 through 4 and 9 through 12. In some examples, a UE may execute a set of instructions to control the functional elements of the UE to perform the described functions. Additionally, or alternatively, the UE may perform aspects of the described functions using special-purpose hardware.

At 1605, the method may include obtaining information associated with the UE, the information including a mobility history of the UE, measurements performed by the UE, a TAU associated with the UE, or any combination thereof, where the UE is positioned outside of an exclusion zone associated with a frequency band. The operations of 1605 may be performed in accordance with examples as disclosed herein. In some examples, aspects of the operations of 1605 may be performed by an information manager 1125 as described with reference to FIG. 11.

At 1610, the method may include determining a probability that the UE is located on an aircraft based on the information. The operations of 1610 may be performed in accordance with examples as disclosed herein. In some examples, aspects of the operations of 1610 may be performed by a UE positioning manager 1130 as described with reference to FIG. 11.

At 1615, the method may include releasing a wireless connection with a serving cell associated with the frequency band based at least in part on the probability satisfying a threshold probability. The operations of 1615 may be performed in accordance with examples as disclosed herein. In some examples, aspects of the operations of 1615 may be performed by a connection manager 1140 as described with reference to FIG. 11.

At 1620, the method may include deprioritizing serving cells associated with the frequency band for cell selection procedures, cell re-selection procedures, handover procedures, or any combination thereof. The operations of 1620 may be performed in accordance with examples as disclosed herein. In some examples, aspects of the operations of 1620 may be performed by a serving cell manager 1145 as described with reference to FIG. 11.

The following provides an overview of aspects of the present disclosure:

- Aspect 1: A method for wireless communication at a network entity, comprising: receiving a report from a UE positioned outside of an exclusion zone associated with a frequency band, wherein the report is associated with a mobility history of the UE, measurements performed by the UE, a TAU associated with the UE, or any combination thereof; determining a probability that the UE is located on an aircraft based at least in part on the report; and performing one or more actions to prevent or restrict access of the UE to the frequency band based at least in part on the probability satisfying a threshold probability.
- Aspect 2: The method of aspect 1, further comprising: identifying one or more serving cells with which the UE was previously connected to based at least in part on the mobility history, wherein determining the probability is based at least in part on the one or more serving cells.
- Aspect 3: The method of aspect 2, further comprising: identifying one or more time durations during which the UE was previously connected to the one or more serving cells based at least in part on the mobility history, wherein determining the probability is based at least in part on the one or more time durations.
- Aspect 4: The method of any of aspects 1 through 3, further comprising: transmitting a request for the report, wherein receiving the report is based at least in part on the request.
- Aspect 5: The method of aspect 4, further comprising: identifying that the UE has established a wireless connection with a serving cell associated with the frequency band, wherein transmitting the request is based at least in part on identifying that the UE has established the wireless connection.
- Aspect 6: The method of any of aspects 4 through 5, further comprising: receiving, via the request, an indication of a time at which a last mobility history report was transmitted by the UE, wherein determining the probability is based at least in part on the indication of the time.
- Aspect 7: The method of any of aspects 1 through 6, wherein the measurements performed by the UE comprise RSRP measurements, RSRQ measurements, or both, associated with reference signals received from one or more serving cells communicatively couplable to the UE, and determining the probability is based at least in part on the RSRP measurements, the RSRQ measurements, or both.
- Aspect 8: The method of any of aspects 1 through 7, wherein the measurements performed by the UE comprise measurements that are performed during one or more of an idle operational mode of the UE, an inactive operational mode of the UE, and a connected operational mode of the UE.
- Aspect 9: The method of any of aspects 1 through 8, further comprising: determining a location of the UE, a speed of the UE, a path of the UE, or any combination thereof, based at least in part on the report, wherein determining the probability is based at least in part on the location, the speed, the path, or any combination thereof
- Aspect 10: The method of any of aspects 1 through 9, further comprising: transmitting, to the UE, control signaling indicating one or more trigger conditions for transmitting reports associated with the frequency band, wherein receiving the report is based at least in part on the control signaling.
- Aspect 11: The method of any of aspects 1 through 10, further comprising: determining an altitude associated with the UE based at least in part on the report, wherein determining the probability is based at least in part on the altitude.
- Aspect 12: The method of any of aspects 1 through 11, further comprising: receiving, via the report, a TAU associated with the UE, a TAI associated with the UE, or both, wherein determining the probability is based at least in part on the TAU, the TAI, or both.
- Aspect 13: The method of aspect 12, further comprising: identifying one or more tracking areas in which the UE was previously positioned based at least in part on the TAU, wherein determining the probability is based at least in part on the one or more tracking areas.
- Aspect 14: The method of aspect 13, further comprising: identifying one or more time durations during which the UE was previously positioned within the one or more tracking areas based at least in part on the TAU, wherein determining the probability is based at least in part on the one or more time durations.
- Aspect 15: The method of any of aspects 1 through 14, wherein performing the one or more actions comprises: transmitting, to the UE, a SIB message comprising a barring parameter associated with a prohibition for camping on serving cells associated with the frequency band.
- Aspect 16: The method of any of aspects 1 through 15, wherein performing the one or more actions comprises: releasing a wireless connection between the UE and a serving cell associated with the frequency band; and transmitting, to the UE based at least in part on releasing the wireless connection, a control message that deprioritizes serving cells associated with the frequency band for a time interval.
- Aspect 17: The method of any of aspects 1 through 16, wherein performing the one or more actions comprises: delaying an establishment of a wireless connection with the UE, an addition of a secondary node at the UE, or both.
- Aspect 18: The method of any of aspects 1 through 17, further comprising: transmitting control signaling indicating a deprioritization of serving cells associated with the frequency band for cell selection procedures, cell re-selection procedures, handover procedures, or any combination thereof, wherein performing the one or more actions is based at least in part on the control signaling.

Aspect 19: The method of any of aspects 1 through 18, wherein the frequency band comprises at least a portion of a C-band.

Aspect 20: The method of any of aspects 1 through 19, wherein the frequency band comprises at least a portion a frequency range between 3.7 GHz and 3.98 GHz.

Aspect 21: The method of any of aspects 1 through 20, wherein the exclusion zone comprises a geographical area associated with an airport in which wireless communication within the frequency band is restricted or prohibited.

Aspect 22: A method for wireless communication at a UE, comprising: obtaining information associated with the UE, the information comprising a mobility history of the UE, measurements performed by the UE, a TAU associated with the UE, or any combination thereof, wherein the UE is positioned outside of an exclusion zone associated with a frequency band; determining a probability that the UE is located on an aircraft based at least in part on the information; and performing one or more actions to prevent or restrict access of the UE to the frequency band based at least in part on the probability satisfying a threshold probability.

Aspect 23: The method of aspect 22, wherein performing the one or more actions comprises: releasing a wireless connection with a serving cell associated with the frequency band; and deprioritizing serving cells associated with the frequency band for cell selection procedures, cell re-selection procedures, handover procedures, or any combination thereof Aspect 24: The method of any of aspects 22 through 23, further comprising: identifying one or more serving cells with which the UE was previously connected to based at least in part on the mobility history, wherein determining the probability is based at least in part on the one or more serving cells.

Aspect 25: The method of aspect 24, further comprising: identifying one or more time durations during which the UE was previously connected to the one or more serving cells based at least in part on the mobility history, wherein determining the probability is based at least in part on the one or more time durations.

Aspect 26: The method of any of aspects 22 through 25, wherein the measurements performed by the UE comprise RSRP measurements, RSRQ measurements, or both, associated with reference signals received from one or more serving cells communicatively couplable to the UE, and determining the probability is based at least in part on the RSRP measurements, the RSRQ measurements, or both.

Aspect 27: The method of any of aspects 22 through 26, further comprising: determining a location of the UE, a speed of the UE, a path of the UE, or any combination thereof, based at least in part on the information, wherein determining the probability is based at least in part on the location, the speed, the path, or any combination thereof Aspect 28: The method of any of aspects 22 through 27, further comprising: determining an altitude associated with the UE based at least in part on the information, wherein determining the probability is based at least in part on the altitude.

Aspect 29: The method of any of aspects 22 through 28, further comprising: identifying one or more tracking areas in which the UE was previously positioned based at least in part on the TAU, wherein determining the probability is based at least in part on the one or more tracking areas.

Aspect 30: The method of aspect 29, further comprising: identifying one or more time durations during which the UE was previously positioned within the one or more tracking areas based at least in part on the TAU, wherein determining the probability is based at least in part on the one or more time durations.

Aspect 31: The method of any of aspects 22 through 30, wherein the frequency band comprises at least a portion of a C-band.

Aspect 32: The method of any of aspects 22 through 31, wherein the frequency band comprises at least a portion a frequency range between 3.7 GHz and 3.98 GHz.

Aspect 33: The method of any of aspects 22 through 32, wherein the exclusion zone comprises a geographical area associated with an airport in which wireless communication within the frequency band is restricted or prohibited.

Aspect 34: An apparatus for wireless communication at a network entity, comprising a processor; memory coupled with the processor; and instructions stored in the memory and executable by the processor to cause the apparatus to perform a method of any of aspects 1 through 21.

Aspect 35: An apparatus for wireless communication at a network entity, comprising at least one means for performing a method of any of aspects 1 through 21.

Aspect 36: A non-transitory computer-readable medium storing code for wireless communication at a network entity, the code comprising instructions executable by a processor to perform a method of any of aspects 1 through 21.

Aspect 37: An apparatus for wireless communication at a UE, comprising a processor; memory coupled with the processor; and instructions stored in the memory and executable by the processor to cause the apparatus to perform a method of any of aspects 22 through 33.

Aspect 38: An apparatus for wireless communication at a UE, comprising at least one means for performing a method of any of aspects 22 through 33.

Aspect 39: A non-transitory computer-readable medium storing code for wireless communication at a UE, the code comprising instructions executable by a processor to perform a method of any of aspects 22 through 33.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, obtaining, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A network entity, comprising:
   one or more memories storing processor-executable code; and
   one or more processors coupled with the one or more memories and individually or collectively operable to execute the code to cause the network entity to:
   receive a report from a user equipment (UE) positioned outside of an exclusion zone associated with a frequency band, wherein the report is associated with a mobility history of the UE, measurements performed by the UE, a tracking area update associated with the UE, or any combination thereof;
determine a probability that the UE is located on an aircraft based at least in part on the report; and
perform one or more actions to prevent or restrict access of the UE to the frequency band based at least in part on the probability satisfying a threshold probability, wherein, to perform the one or more actions, the one or more processors are individually or collectively further operable to execute the code to cause the network entity to:
release a wireless connection between the UE and a serving cell associated with the frequency band; and
transmit, to the UE based at least in part on releasing the wireless connection, a control message that deprioritizes serving cells associated with the frequency band for a time interval.

2. The network entity of claim 1, wherein the one or more processors are individually or collectively further operable to execute the code to cause the network entity to:
receive, via the report, a tracking area update associated with the UE, a tracking area indicator associated with the UE, or both, wherein determining the probability is based at least in part on the tracking area update, the tracking area indicator, or both.

3. The network entity of claim 2, wherein the one or more processors are individually or collectively further operable to execute the code to cause the network entity to:
identify one or more tracking areas in which the UE was previously positioned based at least in part on the tracking area update, wherein determining the probability is based at least in part on the one or more tracking areas.

4. The network entity of claim 3, wherein the one or more processors are individually or collectively further operable to execute the code to cause the network entity to:
identify one or more time durations during which the UE was previously positioned within the one or more tracking areas based at least in part on the tracking area update, wherein determining the probability is based at least in part on the one or more time durations.

5. The network entity of claim 1, wherein the one or more processors are individually or collectively further operable to execute the code to cause the network entity to:
identify one or more serving cells with which the UE was previously connected to based at least in part on the mobility history, wherein determining the probability is based at least in part on the one or more serving cells.

6. The network entity of claim 5, wherein the one or more processors are individually or collectively further operable to execute the code to cause the network entity to:
identify one or more time durations during which the UE was previously connected to the one or more serving cells based at least in part on the mobility history, wherein determining the probability is based at least in part on the one or more time durations.

7. The network entity of claim 1, wherein the one or more processors are individually or collectively further operable to execute the code to cause the network entity to:
transmit a request for the report, wherein receiving the report is based at least in part on the request.

8. The network entity of claim 7, wherein the one or more processors are individually or collectively further operable to execute the code to cause the network entity to:
identify that the UE has established a wireless connection with a serving cell associated with the frequency band, wherein transmitting the request is based at least in part on identifying that the UE has established the wireless connection.

9. The network entity of claim 7, wherein the one or more processors are individually or collectively further operable to execute the code to cause the network entity to:
receive, via the report, an indication of a time at which a last mobility history report was transmitted by the UE, wherein determining the probability is based at least in part on the indication of the time.

10. The network entity of claim 1, wherein the report is associated with measurements performed by the UE comprising reference signal received power measurements, reference signal received quality measurements, or both, associated with reference signals received from one or more serving cells communicatively couplable to the UE, and wherein determining the probability is based at least in part on the reference signal received power measurements, the reference signal received quality measurements, or both.

11. The network entity of claim 1, wherein the report is associated with measurements performed by the UE comprising measurements that are performed during one or more of: an idle operational mode of the UE, an inactive operational mode of the UE, and a connected operational mode of the UE.

12. The network entity of claim 1, wherein the one or more processors are individually or collectively further operable to execute the code to cause the network entity to:
determine a location of the UE, a speed of the UE, a path of the UE, or any combination thereof, based at least in part on the report, wherein determining the probability is based at least in part on the location, the speed, the path, or any combination thereof.

13. The network entity of claim 1, wherein the one or more processors are individually or collectively further operable to execute the code to cause the network entity to:
transmit, to the UE, control signaling indicating one or more trigger conditions for transmitting reports associated with the frequency band, wherein receiving the report is based at least in part on the control signaling.

14. The network entity of claim 1, wherein the one or more processors are individually or collectively further operable to execute the code to cause the network entity to:
determine an altitude associated with the UE based at least in part on the report, wherein determining the probability is based at least in part on the altitude.

15. The network entity of claim 1, wherein to perform the one or more actions, the one or more processors are individually or collectively further operable to execute the code to cause the network entity to:
transmit, to the UE, a system information block message comprising a barring parameter associated with a prohibition for camping on serving cells associated with the frequency band.

16. The network entity of claim 1, wherein to perform the one or more actions, the one or more processors are individually or collectively further operable to execute the code to cause the network entity to:
delay an establishment of a wireless connection with the UE, an addition of a secondary node at the UE, or both.

17. The network entity of claim 1, wherein the one or more processors are individually or collectively further operable to execute the code to cause the network entity to:
transmit control signaling indicating a deprioritization of serving cells associated with the frequency band for cell selection procedures, cell re-selection procedures, handover procedures, or any combination thereof, wherein performing the one or more actions is based at least in part on the control signaling.

18. The network entity of claim 1, wherein the frequency band comprises at least a portion of a C-band.

19. The network entity of claim 1, wherein the frequency band comprises at least a portion of a frequency range between 3.7 GHZ and 3.98 GHz.

20. The network entity of claim 1, wherein the exclusion zone comprises a geographical area associated with an airport in which wireless communication within the frequency band is restricted or prohibited.

21. A user equipment (UE), comprising:
one or more memories storing processor-executable code; and
one or more processors coupled with the one or more memories and individually or collectively operable to execute the code to cause the UE to:
obtain information associated with the UE, the information comprising a mobility history of the UE, measurements performed by the UE, a tracking area update associated with the UE, or any combination thereof, wherein the UE is positioned outside of an exclusion zone associated with a frequency band;
determine a probability that the UE is located on an aircraft based at least in part on the information; and
perform one or more actions to prevent or restrict access of the UE to the frequency band based at least in part on the probability satisfying a threshold probability, wherein to perform the one or more actions, the one or more processors are individually or collectively further operable to execute the code to cause the UE to:
release a wireless connection with a serving cell associated with the frequency band; and
deprioritize serving cells associated with the frequency band for cell selection procedures, cell re-selection procedures, handover procedures, or any combination thereof.

22. The UE of claim 21, wherein the one or more processors are individually or collectively further operable to execute the code to cause the UE to:
identify one or more serving cells with which the UE was previously connected to based at least in part on the mobility history, wherein determining the probability is based at least in part on the one or more serving cells.

23. The UE of claim 22, wherein the one or more processors are individually or collectively further operable to execute the code to cause the UE to:
identify one or more time durations during which the UE was previously connected to the one or more serving cells based at least in part on the mobility history, wherein determining the probability is based at least in part on the one or more time durations.

24. The UE of claim 21, wherein the measurements performed by the UE comprise reference signal received power measurements, reference signal received quality measurements, or both, associated with reference signals received from one or more serving cells communicatively couplable to the UE, and wherein determining the probability is based at least in part on the reference signal received power measurements, the reference signal received quality measurements, or both.

25. The UE of claim 21, wherein the one or more processors are individually or collectively further operable to execute the code to cause the UE to:
determine a location of the UE, a speed of the UE, a path of the UE, or any combination thereof, based at least in part on the information, wherein determining the probability is based at least in part on the location, the speed, the path, or any combination thereof.

26. The UE of claim 21, wherein the one or more processors are individually or collectively further operable to execute the code to cause the UE to:
determine an altitude associated with the UE based at least in part on the information, wherein determining the probability is based at least in part on the altitude.

27. A method for wireless communication at a network entity, comprising:
receiving a report from a user equipment (UE) positioned outside of an exclusion zone associated with a frequency band, wherein the report is associated with a mobility history of the UE, measurements performed by the UE, a tracking area update associated with the UE, or any combination thereof;
determining a probability that the UE is located on an aircraft based at least in part on the report; and
performing one or more actions to prevent or restrict access of the UE to the frequency band based at least in part on the probability satisfying a threshold probability, the one or more actions comprising:
releasing a wireless connection between the UE and a serving cell associated with the frequency band; and
transmitting, to the UE based at least in part on releasing the wireless connection, a control message that deprioritizes serving cells associated with the frequency band for a time interval.

28. A method for wireless communication at a user equipment (UE), comprising:
obtaining information associated with the UE, the information comprising a mobility history of the UE, measurements performed by the UE, a tracking area update associated with the UE, or any combination thereof, wherein the UE is positioned outside of an exclusion zone associated with a frequency band;
determining a probability that the UE is located on an aircraft based at least in part on the information; and
performing one or more actions to prevent or restrict access of the UE to the frequency band based at least in part on the probability satisfying a threshold probability, wherein the one or more actions comprise:
releasing a wireless connection with a serving cell associated with the frequency band; and
deprioritizing serving cells associated with the frequency band for cell selection procedures, cell re-selection procedures, handover procedures, or any combination thereof.

* * * * *